(12) United States Patent
You et al.

(10) Patent No.: US 11,741,971 B1
(45) Date of Patent: Aug. 29, 2023

(54) ACCESSING AND ENCODING DATA USING A LEAST SIGNIFICANT BIT ENCODING ALGORITHM

(71) Applicant: Amazon Technologies, Inc., Seattle, WA (US)

(72) Inventors: Longhua You, Seattle, WA (US); Yingwei Li, Bellevue, WA (US); Yan Cui, Seattle, WA (US); Mayank Thakore, Seattle, WA (US); Tianbin Jiang, Bothell, WA (US); Chunzhang Mo, Seattle, WA (US); Wei Huang, Seattle, WA (US); Shuo Li, Seattle, WA (US); Ross William Snider, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 17/363,718

(22) Filed: Jun. 30, 2021

(51) Int. Cl.
| | |
|---|---|
| *G06F 16/33* | (2019.01) |
| *G06F 40/263* | (2020.01) |
| *G06F 9/451* | (2018.01) |
| *G10L 19/00* | (2013.01) |
| *H04L 49/40* | (2022.01) |
| *G06F 21/10* | (2013.01) |
| *G10L 15/08* | (2006.01) |

(52) U.S. Cl.
CPC .............. *G10L 19/00* (2013.01); *G10L 15/08* (2013.01); *G10L 2015/088* (2013.01)

(58) Field of Classification Search
CPC ..... H04L 63/0853; G06F 21/10; G10L 15/22; G10L 15/26
See application file for complete search history.

(56) References Cited

U.S. PATENT DOCUMENTS 10,410,000 B1 * 9/2019 Ghafourifar ............ G06F 21/10
11,153,307 B1 * 10/2021 Davey ................. H04L 63/0853

\* cited by examiner

*Primary Examiner* — Farzad Kazeminezhad
(74) *Attorney, Agent, or Firm* — Pierce Atwood LLP

(57) ABSTRACT

Techniques for improving systems for tracking data access are provided. A system for accessing and encoding data may, upon receiving a request for data, determine whether the data needs to be encoded for the purpose of tracking access to the data. If the system determines that the data needs to be encoded, the system may further determine the information which is to be encoded into the data, such as a client ID/user ID, timestamp, etc. The system may further determine an encoding scheme for the data such as a least significant bit algorithm. The system may further determine encoding data based on the encoding scheme and the information which is to be encoded into the data. The system may also encode the encoding data into the data based on the encoding scheme.

22 Claims, 13 Drawing Sheets

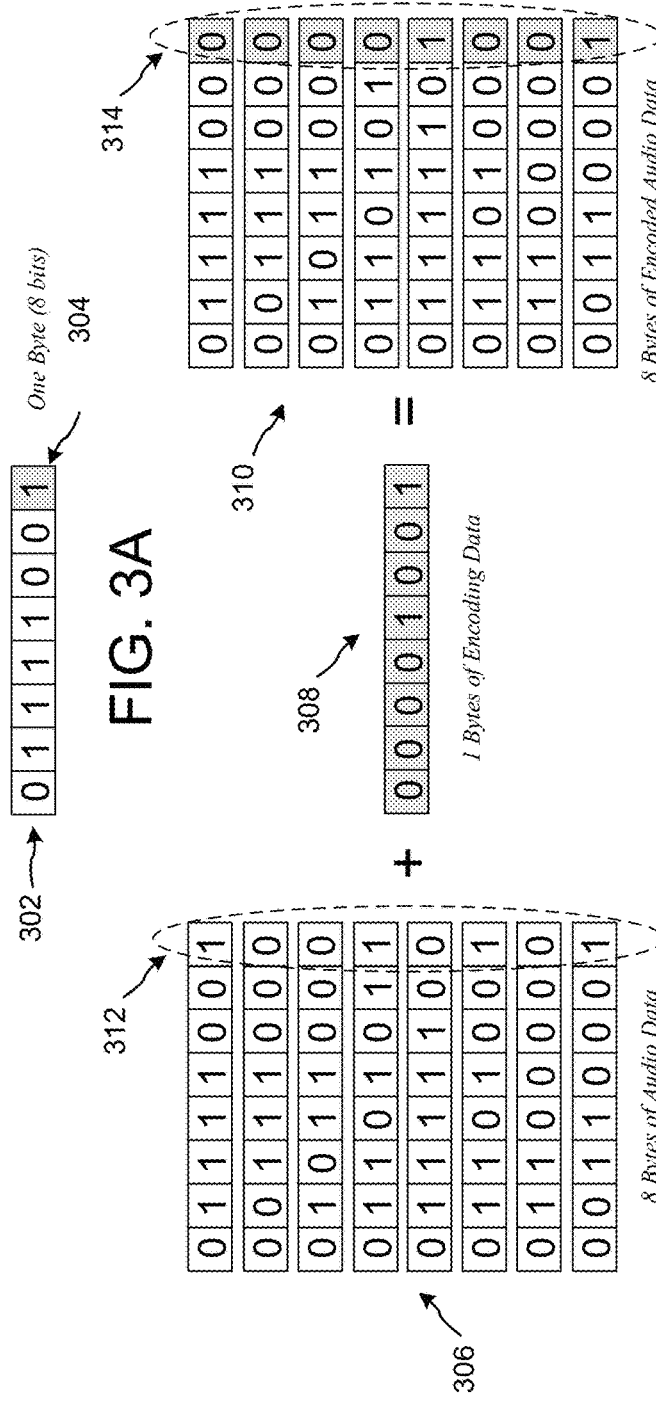
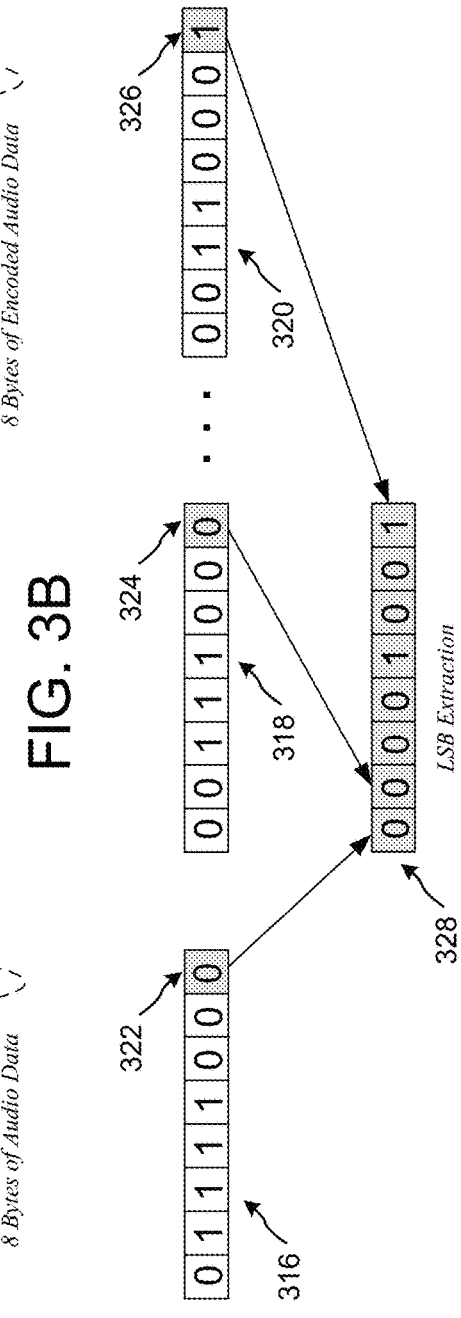
FIG. 3A
FIG. 3B
FIG. 3C

US 11,741,971 B1

ACCESSING AND ENCODING DATA USING A LEAST SIGNIFICANT BIT ENCODING ALGORITHM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing.

Speech processing may also involve converting a user's speech into text data which may then be provided to various text-based software applications. Further, speech processing may be used by computers, hand-held devices, telephone computer systems, kiosks, and a wide variety of other devices to improve human-computer interactions. Speech processing itself may be improved by analyzing the received audio input or related audio files, determining how well the speech processing was performed on the received audio input or related audio files, and adjusting the speech processing accordingly.

BRIEF DESCRIPTION OF DRAWINGS

For a more complete understanding of the present disclosure, reference is now made to the following description taken in conjunction with the accompanying drawings.

FIG. 3A-3C are conceptual diagram illustrating encoding and extracting data into/from an example byte, according to embodiments of the present disclosure.

DETAILED DESCRIPTION

Figure 1:
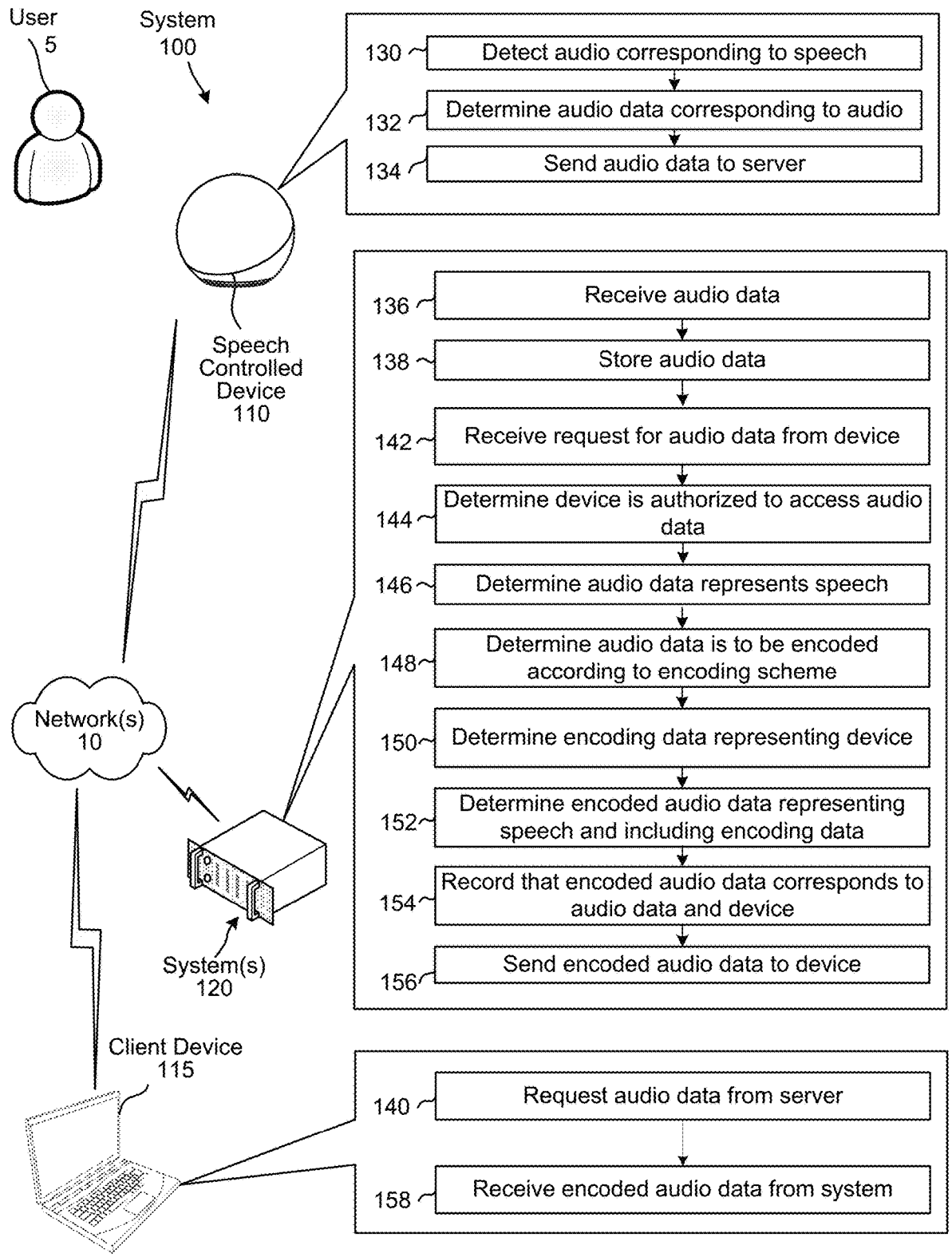
FIG. 1 is a conceptual diagram illustrating a system for encoding data, according to embodiments of the present disclosure.

A virtual assistant system (the "system" or the "assistant") can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

Voice-enabled and/or speech processing systems may receive as input audio corresponding to utterances by users and, in response to those utterances, perform related actions. The actions may include, for example, providing information (e.g., news, weather, etc.) or controlling household devices (e.g., lights, televisions, etc.). The audio or related audio data/files corresponding to the utterances may be stored by the system and analyzed, evaluated, and/or reviewed as part of quality control for the voice-enabled and/or speech processing systems. For example, to ensure that speech processing components are operating appropriately, it may be desirable (assuming user permission) to have a human reviewer analyze speech processing results and the original audio that led to those results, to perform quality control.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

To maintain integrity and ensure security and privacy of the audio data for the users, a system may incorporate various security measures to protect access to the audio data. Further, the system may track access of the audio data. This may include, for example, tracking what users have accessed the audio data and which devices were used to access the data.

To monitor and track data access, a system may use different devices and systems to log/record data indicating access to protected information, such as audio data. Such data may be stored in various locations across a system. To improve upon such techniques, the system may, in addition or in the alternative, insert encoded data into other data files (such as audio data files) so that the individual files themselves are encoded with information indicating how and/or by which device(s)/profile(s) the underlying file was accessed, stored, processed, etc. For example, the information indicating how the underlying file was accessed and/or related details describing the file or associated data may be referred to as data access information. Such data access information may be part of an attribute of a request for data. The data access information may describe how the underlying file or data was accessed and may include, for example, a client ID (e.g., of a client requesting the data), a message version (e.g., a watermarking version), a key version, a source ID (e.g., of a device that initially received or determined the data), a user (e.g., a user ID) of the user requesting access to the data (e.g., the user operating client device 115), a timestamp (e.g., when the data was requested or provided), and/or a data type of the data. In other words, the data access information may be stored in the particular data file for which data access information is sought, such that the data access information can be decoded from the data itself to determine, for example, who accessed the data, which device was used to access the data, when the data was accessed, etc. In this manner information regarding access to the data file may be obtained and analyzed even if the data file is separated from the original system (e.g., separated from the logged/recorded data indicating access to the protected file).

Figure 4:
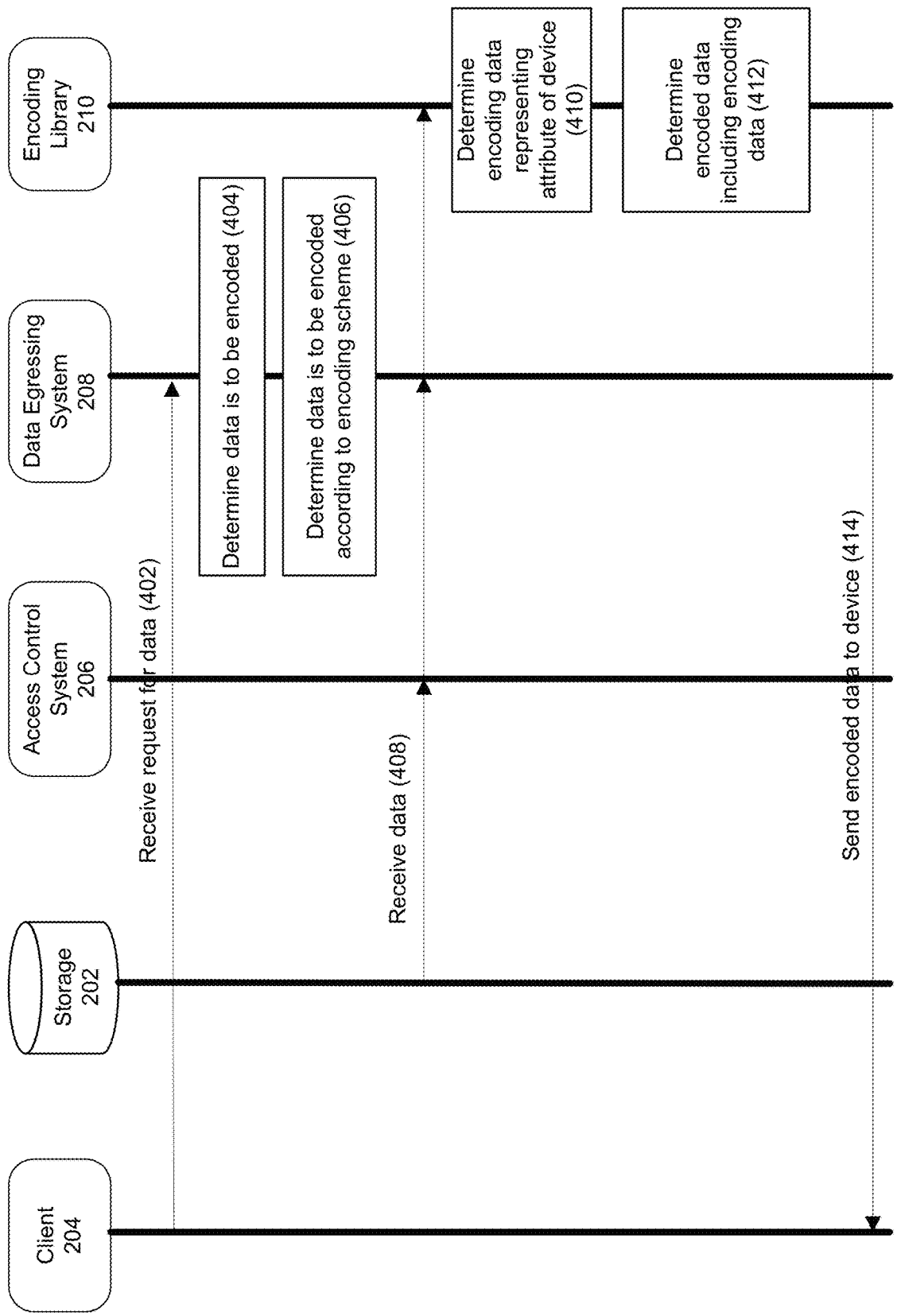
FIG. 4 is process flow diagram illustrating example operations for accessing and encoding data, according to embodiments of the present disclosure.

It should be noted that while this disclosure focuses on inserting encoded data in the context of audio, audio data, and/or audio files, the use of audio is referred to as an example for purposes describing the techniques and features of the present disclosure and thus is intended for illustrative purposes only and not intended to limit the scope of the present disclosure. For example, the techniques and features of the present disclosure may also be applied to video, video data, video files, images, image data, image files, and/or other types of content, data, and files, particularly files where certain data may be removed from the original file to make room for encoded data without significantly compromising the underlying file itself. For example, while FIG. 1 shows, for illustrative purposes only, a process for inserting encoded data in the context of audio, FIG. 4 illustrates example operations for inserting encoded data broadly in the context of data in general, regardless of the type of content represented by the data.

Further, it should be noted that while this disclosure discusses inserting the encoded data in the context of, or in response to, an attempt to access data (e.g., audio data, video data, image data, or other content as discussed above), this is not intended to be a limitation of the disclosure as the encoded data may be inserted without an attempt to access, or independent of an attempt to access, the data. Additionally, while the encoded data is discussed in the context of representing data access information as discussed above, the encoded data may represent information unrelated to accessing the data. Thus, the techniques and features for encoding data described by the present disclosure may be applied in other contexts unrelated to accessing the data.

Many different encoding schemes exist, particularly for media data. For example, image data may be encoded using schemes such as JPEG (Joint Photographic Experts Group), TIFF (Tagged Image File Format), or others; audio data may be encoded using schemes such as WAV (Waveform Audio File Format), MP3 (MPEG-1 (Motion Picture Experts Group) Audio Layer III or MPEG-2 Audio Layer III)), or others; and video data may be encoded using schemes such as MPEG-4, AVI (Audio Video Interleave), or others. Such encoding schemes typically are standardized in a way that encodes the data to compress it for purposes of easier distribution. These encoding schemes do not address watermarking/encoding, in a machine-readable but not user-perceptible way, attributes of a request for data such as an identifier of a device that will access the data, or other attributes discussed herein.

FIG. 1 is a conceptual diagram illustrating a system 100 for encoding data, according to embodiments of the present disclosure. As noted, FIG. 1 and other figures/descriptions herein focus on the encoding of data with regard to audio and audio data, but the present disclosure is not necessarily limited to audio. As shown in FIG. 1, the system 100 may include a voice-enabled device or speech-controlled device 110 local to a user 5, a natural language command processing system(s) 120 (abbreviated "system(s) 120"), and one or more skill support systems 125 (shown in FIG. 7) connected across one or more networks 199. Although the figures and discussion of the present disclosure illustrate certain steps in a particular order, the steps described may be performed in a different order (as well as certain steps removed or added) without departing from the present disclosure.

The device 110 may detect and/or receive (130) audio corresponding to a spoken natural language input (e.g., speech) originating from the user 5. The device 110 may process audio following detection of a wakeword (described further below with regard to component 720 as discussed in regard to FIG. 7). The device 110 may determine and/or generate (132) audio data corresponding to the audio, and may send (134) the audio data to the system(s) 120 (e.g., server(s)). The device 110 may send the audio data to the system(s) 120 via an application that is installed on the device 110 and associated with the system(s) 120. An example of such an application is the Amazon Alexa application that may be installed on a smart phone, tablet, or the like. In some implementations, the device 110 may receive text data 713 (shown in FIG. 7) corresponding to a natural language input originating from the user 5, and send the text data to the system(s) 120. The device 110 may also receive output data from the system(s) 120, and generate a synthesized speech output. The device 110 may include a camera for capturing image and/or video data for processing by the system(s) 120. Examples of various devices 110 are further illustrated in FIG. 13. The system(s) 120 may be a remote system such as a group of computing components located geographically remote from the device 110 but accessible via network 199 (for example, servers accessible via the internet). The system(s) 120 may also include a remote system that is physically separate from device 110 but located geographically close to device 110 and accessible via network 199 (for example a home server located in a same residence as device 110). The system(s) 120 may also include some combination thereof, for example where certain components/operations are performed via a home server(s) and others are performed via a geographically remote server(s).

Figure 2:
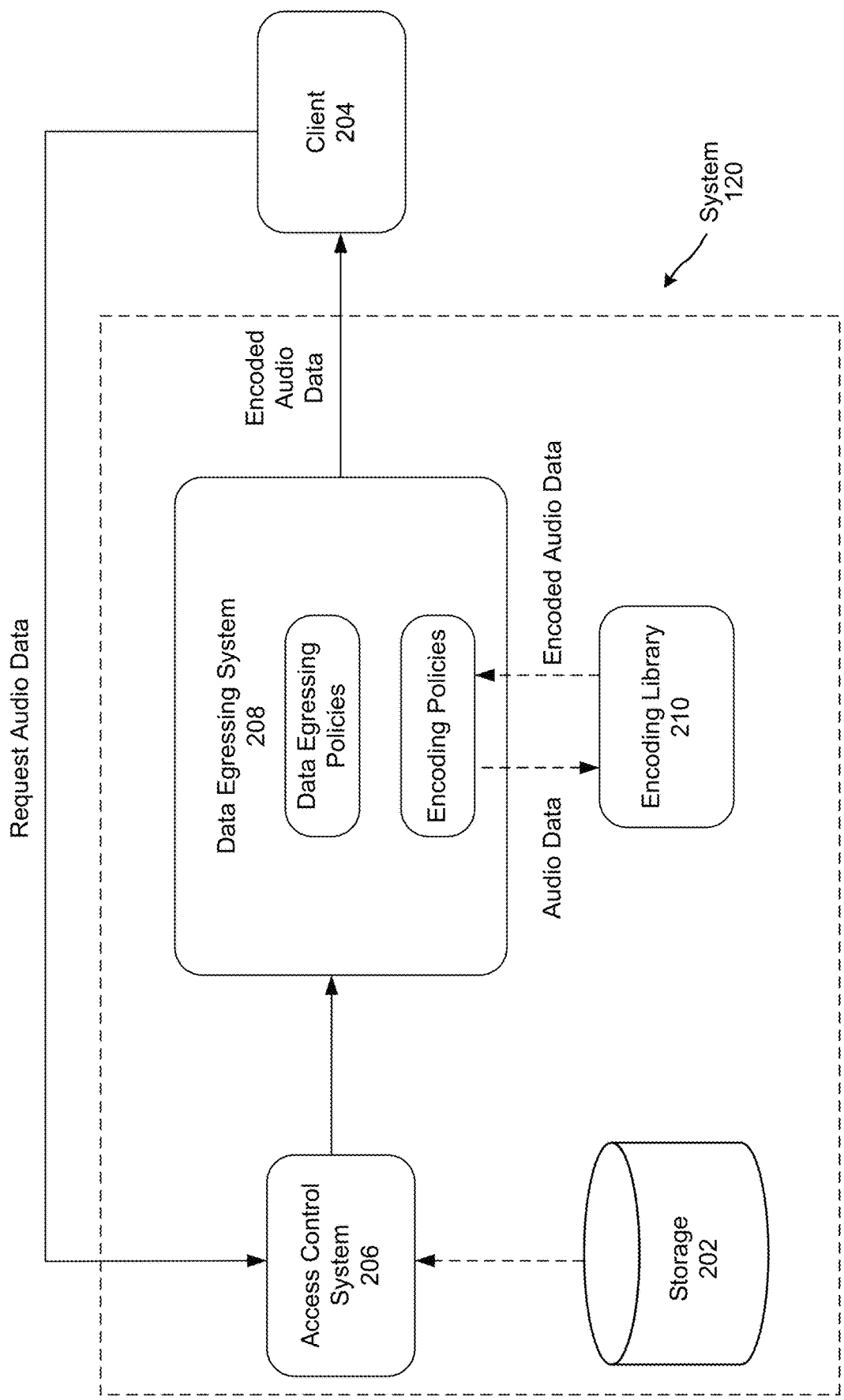
FIG. 2 is a schematic diagram of an illustrative architecture of a system for accessing and encoding data, according to embodiments of the present disclosure.
Figure 7:
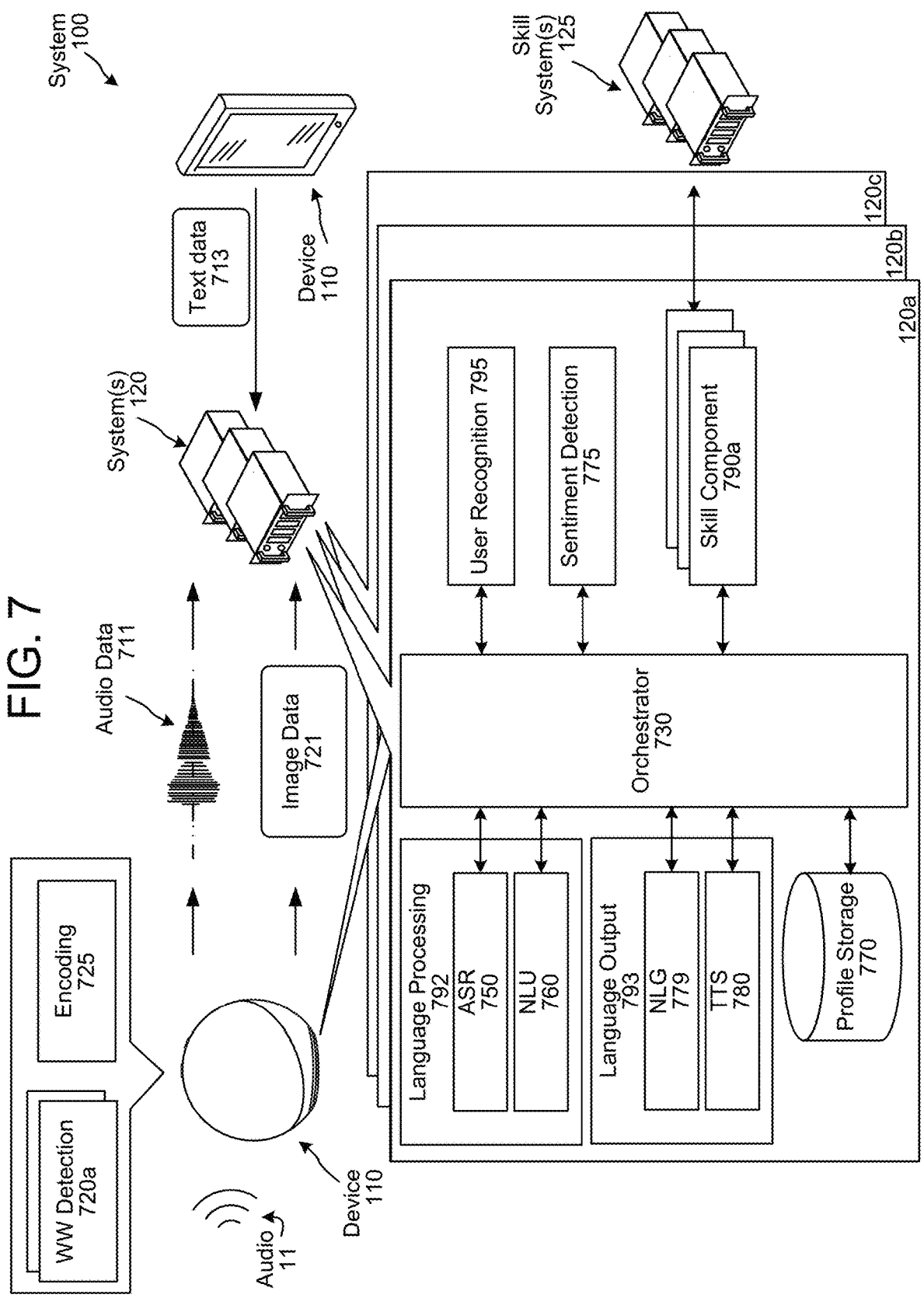
FIG. 7 is a conceptual diagram of components of a speech processing system, according to embodiments of the present disclosure.

The system(s) 120 may receive (136) the audio data from the device 110. The device 110 may be any of the devices shown in FIG. 13 that include, for example, one or more components for speech processing as shown in FIG. 7 and/or an application for sending audio data such as Amazon Alexa. Although not illustrated in FIG. 1, the system(s) 120 may perform speech processing on the audio data and return, to the device 110, output data resulting from that speech processing. The system(s) 120 may also store (138) the audio data, for example for the purposes of performing quality control with regard to the speech processing results. Referring to FIG. 2, an example system 120 for accessing and encoding data is shown. The system 120 may include storage 202, which may incorporate a data store or data mart structure or data warehouse environment. The system 120 may include various systems/subsystems and libraries to enforce access and encoding policies of data. The storage 202 may store audio data, audio files, video data, video files, image data, image files, and/or other types of content, data, and files (e.g., transcriptions). The system(s) 120 may store the audio data in storage 202.

The client device 115 may send (140), and the system(s) 120 may receive (142), a request for the audio data from a client device (e.g., laptop 115). The client device is shown as laptop 115 in FIG. 1 for illustrative purposes only but may be any client device. For example, the client device may be client 204 as shown in FIG. 2 and the laptop 115 is an example of the client 204. The client 204/client device 115 may, for example, be the device corresponding to a user who is authorized to review the audio data and/or speech processing results to perform quality control. The request from the client device 115 may be received by access control system 206 of system 120 (e.g., of system(s) 120). The access control system 206 may be a system that provides access to data objects stored in the storage 202. Clients such as the client 204 (e.g., laptop 115) may, instead of directly interacting with the storage 202, use the access control system 206 to access and/or delete data such as the audio data. The access control system 206 may provide synchronous, real-time access to the data objects stored in the storage 202.

Prior to providing access to the requested audio data the system(s) 120 may determine (144) that the client device 115 (and/or the user operating the client device 115) is authorized to access the audio data. For example, the access control system 206 may use a data egressing system 208, which includes data egressing policies, to determine whether the client 204 (e.g., laptop 115) is authorized to access the audio data. The access control system 206 may also determine whether the user operating the client 204 (e.g., laptop 115) is permitted to access the requested file, for example by requiring a particular access credential (e.g., password, biometric authentication, multi-factor authentication, fob, etc.). The data egressing system 208 may be integrated with the access control system 206 and may enable data publishers and/or consumers to manage policy, retention requirements, and access controls as they relate to data stored by the storage 202. It should be noted that the data egressing approach including the data egressing system 208 of system 120 is an illustrative example for system integration with low latency. In some implementations, where latency constraints may be more flexible, the system 208 may be a stand-alone service for encoding data as described herein.

The data egressing policies may include policy data which describes criteria for determining whether a client/user is authorized to access requested data (e.g., the requested audio data). The criteria may be based on the client/user requesting to access the data and the data being requested. For example, the criteria may include the user's title or position being at a certain level, a security level associated with the user, an experience level associated with the user, a team or project group that the user may be associated with, security details associated with the client such as networking details, location, IP address, MAC address, etc., and/or whether access to the data was specifically authorized for the client/user.

The system(s) 120 may be configured to encode data in a different manner depending on the type of data to be accessed. To that end, the system(s) 120 may determine (146) that the audio data represents speech. For example, the access control system 206 may determine, for example from metadata or data describing the requested audio data, whether the audio data represents speech. The system(s) 120 may determine (148) that the audio data is to be encoded according to a particular encoding scheme. For example, the data egressing system 208 may include data egressing policies and/or encoding policies, one or more of which may be used by the data egressing system 208 to determine that the audio data is to be encoded with certain data and in a certain manner.

The encoding policies may include policy data which describes criteria for determining whether the requested data (e.g., the requested audio data) is to be encoded. The criteria may be based on whether the audio data represents speech, what speech system is associated with the audio data, the age of the audio data, descriptive data or user selected criteria corresponding to the original speaker, a sensitivity or security level associated with the audio data, or other information. Thus, determining that the audio data is to be encoded may be based on one or more factors including, but not limited to, whether the audio data represents speech, what speech system is associated with the audio data, the age of the audio data, descriptive data or user selected criteria corresponding to the original speaker, a sensitivity or security level associated with the audio data, the content or data type of the speech (e.g., personal health information, etc.), whether the requesting client device is a data consumer system, or other information. The data egressing system 208 may further determine how the audio data is to be encoded. In other words, as described below, the data egressing system 208 may determine an encoding scheme for the audio data based on the policy data. Some of the policy data may be included with both the data egressing policies and the encoding policies.

Encoding, which may also be referred to as watermarking, may be the process of embedding information into data for safekeeping such that the embedded or encoded information may be extracted or decoded at a later time. Such encoding or watermarking may be used to track and trace data (e.g., the audio data) so that it can more easily be determined, for example, who last accessed the data, which device was used to access the data, when the data was accessed, or the like, depending on the information encoded into the data file. In this way, by decoding the embedded information upon discovery of a data file outside of where it is supposed to be, important information about access to the file may be determined, even if access to the access control system 206, or other logging system is unavailable.

The system(s) 120 may determine (e.g., via the data egressing system 208) the specific encoding scheme to be used for the particular data being accessed and the circumstances/context in which the data is being accessed. The specific encoding scheme may be selected from many encoding schemes or algorithms included in the data egressing system 208 (e.g., encoding policies) or in the encoding library 210. One example of an encoding scheme is one that uses a least significant bit (LSB) algorithm. Another example of an encoding scheme is one that uses a spread spectrum algorithm. FIGS. 3A-3C illustrate an example encoding scheme based on a LSB algorithm. The LSB algorithm may be a steganography method used to conceal the existence of data embedded in information. The LSB may represent a bit at the unit's place in the binary representation of a number. For example, the decimal number 121 may be represented in binary notation as 01111001 (expressed using a little endian system). As shown in FIG. 3A, the decimal number 121 may be represented in one byte (eight bits) 302 where the least significant bit 304 is 1.

As shown in FIG. 3B, eight bytes of carrier data (such as audio data) 306 may be encoded with one byte of encoding data 308 to create eight bytes of encoded audio data 310. The audio data 306 may represent the original audio data and the encoding data 308 may represent the data access information for the audio data (e.g., the client/user requesting the audio data, the time of the request, etc.) or other information (e.g., a message). Thus, the encoded audio data 310 may be the audio data 306 encoded with the encoding data 308. As shown, embedding the encoding data 308 into the audio data 306 using the LSB algorithm may include overwriting or otherwise replacing the "least significant bit" of each byte of the audio data 306 (e.g., least significant bits 312 shown as 10010101). In other words, the encoding data may be located in the encoded audio data based on the encoding scheme (e.g., the LSB algorithm or related). As a result, the encoded audio data 310 may be determined and/or created and may include the encoding data 308 (shown as 00001001) in the position of the least significant bits 314 of the encoded audio data 310. FIG. 3C shows decoding or extracting the encoding data 308 from the encoded audio data 314, which will be described in further detail below.

As noted, an LSB algorithm is simply an example of an encoding scheme. Data may be encoded using an LSB algorithm, a most significant bit (MSB) algorithm, an algorithm that may utilize other bits of the bytes of data, or some other encoding scheme entirely.

Referring back to FIG. 1, the system(s) 120 may determine (150) encoding data representing the client device (e.g., client 204 such as laptop 115). For example, referring to FIG. 2, the data egressing policies and/or encoding policies may be used by the data egressing system 208 to determine that the identity of the client device (e.g., client ID), or one or more other attributes of the client device/data request, is important data access information to include in the encoding data. Other attributes of the request may also be determined to be included in the encoding data including, but not limited to, a message version (e.g., a watermarking version), a key version, a source (e.g., a device that initially received the audio corresponding to the audio data), a user (e.g., a user ID) of the user requesting access to the audio data (e.g., the user operating client device 115), a timestamp (e.g., when the audio data was requested or provided), and a data type. For example, the encoding data (e.g., the encoding data 308) may be determined and/or generated to represent any of the data access information. The encoding data may be based on the encoding scheme determined, e.g., by the data egressing system 208.

The system(s) 120 may determine (152) and/or generate encoded audio data representing the speech. The encoded audio data may include the encoding data that was inserted in the place of other data within the audio data (e.g., certain LSBs that were removed to make room for the encoded data). For example, the audio data 306 may represent the speech (e.g., corresponding to audio initially received at the speech controlled device 110 from user 5) and the encoding data 308 may include the data access information which may indicate or identify, for example, the client device (e.g., client 204 such as laptop 115). The encoded audio data (e.g., the encoded audio data 310) may be determined and/or generated (e.g., by the encoding library 210) as shown, for example, by techniques illustrated with respect to FIG. 3B. Thus, the encoded audio data 310 may represent the speech (e.g., corresponding to the audio data 306) and also include the encoding data 308 representing the client device (e.g., the client 204 such as laptop 115). In this way, the encoded audio data (e.g., encoded audio data 310) may be based on the audio data (e.g., audio data 306).

The encoding scheme may indicate one or more positions in the audio data (e.g., addressable portions of data) at which the encoding data is to be placed or where the encoding data is to begin overwriting or replacing one or more bits of the audio data. This may be referred to as the first bit position. In some implementations, the first bit position may correspond to a least significant bit. For example, the encoding data may begin overwriting or replacing bits of the audio data at the first bit, the last bit, the fourth bit, the Nth bit, etc. (in other words, the first bit position may be the first bit, the last bit, the fourth bit, the Nth bit, respectively). Additionally, the encoded audio data may include one or more bits which describe the encoding scheme. For example, if the encoding data begins overwriting or replacing bits of the audio data at the Nth bit, the first few bits of the encoded audio data at the Nth bit may indicate that the encoding scheme first encodes the client ID. In another example, the encoded audio data at the Nth bit may indicate that the encoding scheme first encodes the timestamp and then encodes the user ID.

The system(s) 120 may record (154) that the encoded audio data corresponds to the audio data and the client device. For example, the data egressing system 208 may record in storage 202 that the encoded audio data 310 corresponds to the audio data 306 in a log file, list, database entry, etc. Further, the data egressing system 208 may record that the encoded audio data represents the laptop 115). This may allow the system(s) 120 (via, e.g., the data egressing system 208) to keep track of which audio data has been encoded (watermarked) and which data access information (or other information) is encoded into the audio data.

Once the encoded data is inserted into the audio data and the encoded audio data is created, the systems 120 may send (156) the encoded audio data to the client device. For example, the data egressing system 208 may send the encoded audio data 310 to the client 204 (e.g., the laptop 115). Also, the client device may receive (158) the encoded audio data from the system(s) 120. For example, the client 204 (e.g., the laptop 115) may receive the encoded audio data 310 from the data egressing system 208.

In some embodiments, the system(s) 120 may receive another request for the audio data from another client device (e.g., a second client device) that may be different than the client device 115. The system(s) 120 may repeat the steps discussed with regard to FIG. 1, only for the new device. For example, the system(s) 120 may determine that the second client device is authorized to access the audio data. The system(s) 120 may determine, based on the second client device, further encoding data (e.g., second encoding data) that represents the second client device or other data access information as described here. The system(s) 120 may determine, based on the audio data, different encoded audio data (e.g., second encoded audio data) including the second encoding data. In some implementations, the system(s) 120 may overwrite or replace the previous encoding data associated with the request from the laptop 115 with the second encoding data. Further, in some implementations, the system(s) 120 may append the previous encoding data associated with the request from the laptop 115 with the second encoding data, such as when the original first encoded audio data is then accessed by a second client device. Thus, the system(s) 120 may append new encoded data to already encoded audio data, thus preserving a list of client devices, times, etc. corresponding to different instances of access to the underlying audio data.

For example, the original first encoded audio data may include first encoding data that represents the client ID (e.g., the first client ID) of the laptop 115 and a first timestamp indicating when the original first encoded audio data was accessed. A second client device with a second client ID may request the audio data corresponding to the original first encoded audio data. The encoding library 210 may encode the original first encoded audio data with second encoding data that represents the second client ID and a second timestamp by appending the second encoding data to the first encoding data. For example, if a first portion of bits of the first encoding data represent the first client ID, the encoding library 210 may append the first portion of bits of the first encoding data with a second portion of bits of the second encoding data that represents the second client ID.

To further illustrate the operations for accessing and encoding data that may be performed by the components of the system 120, FIG. 4 shows a process flow diagram illustrating such example operations. As discussed above, the system 120 may include the data storage 202, the access control system 206 which may provide access to data stored in the storage 202, the data egressing system 208 which may be integrated with the access control system 206 and which may enable management of policy and data access and include data egressing and encoding policies, and encoding library 210 which may encode (e.g., apply watermarks to) audio data if a request from the client 204 meets certain criteria under the data egressing policies.

The data egressing system 208 (e.g., via the access control system 206) may receive (402) a request for data (e.g., audio data) from a client device. For example, the access control system 206 may receive a request for audio data 306 from client 204 which may pass or indicate the request to the data egressing system 208. Further, the data egressing system 208 may determine (404) that the data (e.g., the audio data) is to be encoded (e.g., based on the audio data representing speech). For example, the data egressing system 208 may determine that the audio data 306 represents speech. Also, the data egressing system 208 may determine (406) that the data (e.g., the audio data) is to be encoded according to an encoding scheme. For example, the data egressing system 208 may determine (e.g., under the data egressing and/or encoding policies) that the audio data 306 is to be encoded based on an LSB algorithm (e.g., as shown in FIGS. 3A-3C).

Further, the access control system 206 may receive (408) the data (e.g., the audio data) from the storage. For example, the access control system 206 may retrieve the audio data 306 from the storage 202 and pass the audio data 306 to the data egressing system 208. The data egressing system 208 may pass the audio data 306 to the encoding library 210. The encoding library 210 may determine (410) encoding data. The encoding data may represent an attribute of the request, client device and/or other data access information as described above. For example, the encoding library 210 may determine and/or generate the encoding data 308 which may represent an attribute of request, the client device and/or other data access information. The encoding library 210 may also determine (412) encoded data (e.g., encoded audio data). The encoded audio data may represent the speech and include the encoding data. For example, the encoding library 210 may determine and/or generate the encoded audio data 310 which may represent the audio data 306 and include encoding data 308. The encoding library 210 may pass the encoded audio data 310 to the data egressing system 208. The data egressing system 208 may send (414) the encoded audio data to the client device. For example, the data egressing system 208 may send the encoded audio data 310 to the client 204.

As discussed above, to maintain integrity and ensure security and privacy of the audio data for the users, it may be desirable to track access of the audio data, which may include tracking who has accessed the audio data and which devices were used to access the data. Some users or administrators of a system may desire to delete or remove the audio data and/or other data or files related to the audio data (e.g., encoded audio data, etc.) from the system. As different versions of the audio data (e.g., encoded audio data) may be sent and received by various devices scattered around the system, it may be difficult to delete or remove most or all instances of the audio data (e.g., which may include encoded audio data) from the system or otherwise from devices that received the audio data or the encoded audio data. Based on the encoding scheme used to encode the audio data or the encoded audio data itself, the system(s) 120 may cause the encoded audio data to be deleted from devices (e.g., client devices such as the client 204 or the laptop 115).

While the examples provided in the present disclosure have discussed encoding audio data that have been previously stored by the system 120, it may also be possible for local devices 110 to encode audio data prior to sending audio data to the system 120 or to downstream components, such as speech processing components. Such operations may be useful for encoding various information about the audio data created by a speech controlled device 110, such as the device ID (or other attributes of the device/request), the time of capture, the identify of a particular wakeword or wake trigger that cause the device 110 to capture audio, a user ID identifying the voice detected (or other users in the room), sentiment of the user, or other data available to the local device 110.

Figure 5:
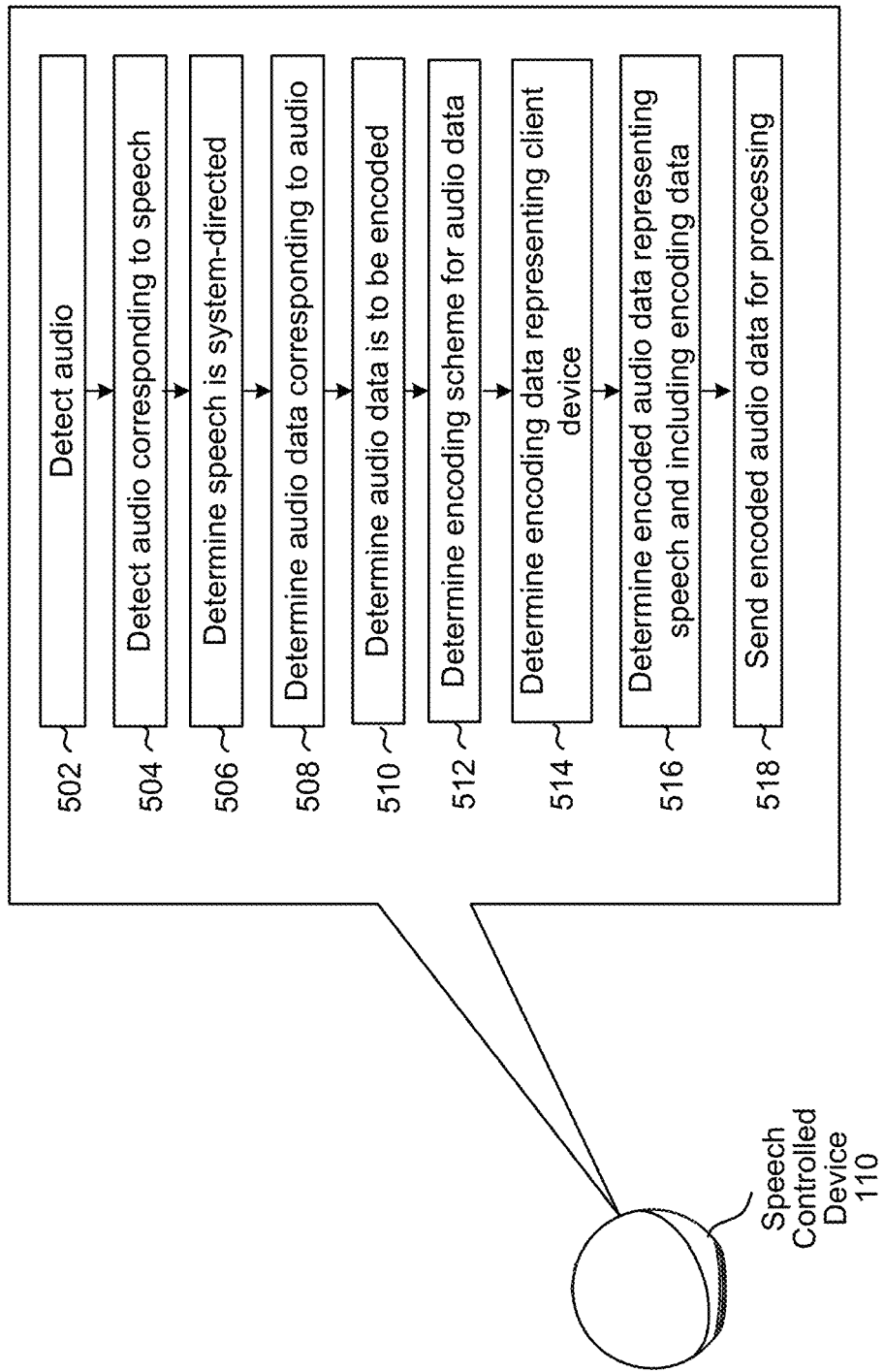
FIG. 5 is conceptual diagram illustrating example operations for encoding audio data as captured by a speech controlled device, according to embodiments of the present disclosure.

Referring now to FIG. 5, example operations for encoding data with a voice-enabled or speech-controlled device (e.g., device 110) are shown. The device 110 may detect and/or receive (502) audio. The audio may correspond to a spoken natural language input (e.g., speech) originating from a user (not shown). The device 110 may detect (504) audio corresponding to speech, for example by detecting speech using voice-activity-detection (VAD) or other techniques, such as those discussed herein. The device 110 may determine (506) that the speech is system-directed, namely speech intended for processing by the system. To do this, the device 110 may detect the presence of a wakeword, as discussed herein, may detect that the user is looking at a device 110, or otherwise determine the speech is directed at the system. The device 110 may determine and/or generate (508) the audio data corresponding to the audio.

The device 110 may determine (510) that the audio data is to be encoded. For example, in some embodiments, the device 110 may include an encoding component such as the encoding component 725 as shown in FIG. 7. The encoding component 725 may include one or more components shown in system 120 of FIG. 2. For example, the encoding component 725 may include one or more of the data egressing policies and/or encoding policies of the data egressing system 208, one or more of which may be used by the encoding component to determine that the audio data is to be encoded. Determining that the audio data is to be encoded may be based on one or more factors including, but not limited to, whether the audio data represents speech. The encoding component 725 may further determine how the audio data is to be encoded. In other words, the device 110

(e.g., via the encoding component 725) may determine (512) an encoding scheme for the audio data.

For example, the device 110 may determine (e.g., via the encoding component 725) that the encoding scheme is to be, or is to be based on, a least significant bit (LSB) algorithm, which may be selected from many encoding schemes or algorithms included in the data egressing policies and/or encoding policies of the encoding component 725. The LSB algorithm may be similar to the LSB algorithm described above in connection with FIGS. 3A-3C.

The device 110 may determine (514) encoding data (such as a client ID) representing the client device. The client device ID may represent the voice-enabled or speech-controlled device 110 itself. For example, the data egressing policies and/or encoding policies of the encoding component 725 may be used by the encoding component 725 to determine that the identity (e.g., client ID) of the client device (e.g., the device 110), or one or more other attributes of the request/client device, is important data access information to include in the encoding data. Other data access information may also be determined to be included in the encoding data including, but not limited to, a message version (e.g., a watermarking version), a key version, a source (e.g., a device that initially received the audio corresponding to the audio data such as the device 110 in present example), a user (e.g., a user ID), a user sentiment, a detected wakeword, a timestamp (e.g., when the audio data was requested), and a data type. For example, the encoding data (e.g., the encoding data 308) may be determined and/or generated to represent any of the data access information. The encoding data may be based on the encoding scheme determined, e.g., by the data egressing policies and/or encoding policies of the encoding component 725.

The device 110 may encode a variety of data (e.g., data access information) into the audio data. For example, in some embodiments, the device 110 may include a user recognition component 795 to determine the user, and/or user ID, of the user speaking (or other users that may be present). The user recognition component 795 may recognize one or more users using a variety of data, as described in greater detail below with regard to FIGS. 8-9. Using the techniques and features described by the present disclosure, once the user is recognized by the user recognition component 795, the device 110 may encode the audio data with a user ID corresponding to the user.

Further, in some embodiments, the device 110 may include a sentiment detection component 775 to determine a user sentiment. The sentiment detection component 775 may be configured to detect a sentiment of a user from audio data representing speech/utterances from the user, image data representing an image of the user, and/or the like as described in greater detail below with regard to FIG. 10. Using the techniques and features described by the present disclosure, once the user sentiment is determined by the sentiment detection component 775, the device 110 may encode the audio data with the user sentiment corresponding to the user.

Additionally, in some embodiments, the device 110 may include one or more wakeword detection components 720a-720n to detect a wakeword that may be uttered by a user. The one or more wakeword detection components 720a-720n may be configured to detect the wakeword from audio or audio data as described in greater detail below with regard to FIG. 7. Using the techniques and features described by the present disclosure, once the wakeword is detected by the one or more wakeword detection components 720a-720n, the device 110 may encode the audio data with the detected wakeword. The detected wakeword may indicate which wakeword detector (e.g., wakeword detector 720a, 720b, 720c, etc.) caused the encoded audio data to be sent (e.g., to system(s) 120) for processing.

The device 110 may determine (516) and/or generate encoded audio data representing the speech. The encoded audio data may include the encoding data. In some embodiments, the encoding component 725 of the device 110 may include the encoding library 210 of the system 120 of FIG. 2. Referring to FIG. 3B, the audio data 306 may represent the speech (e.g., corresponding to audio received by the device 110) and the encoding data 308 may include attributes of a request to send data representing the audio to another device, such as a system or component for performing speech processing. In an example of the local device being the device that captures audio and then encodes it according to the techniques described herein, the encoded audio data may include data representing attributes such as a user ID, detected wakeword, detected sentiment corresponding to speech and/or data access information which may indicate or identify, for example, the client device (e.g., the device 110). The encoded audio data (e.g., encoded audio data 310) may be determined and/or generated by the encoding library 210 of the encoding component 725 of the device 110 as shown, for example, by FIG. 3B. Thus, the encoded audio data 310 may represent the speech (e.g., corresponding to audio data 306) and also include the encoding data 308 representing the client device (e.g., the device 110). In this way, the encoded audio data (e.g., encoded audio data 310) may be based on the audio data (e.g., audio data 306). The device 110 may send (518) the encoded audio data to, for example, the system(s) 120 for processing.

As discussed above, it may be desirable to determine data access information such as who has accessed the audio data and which devices were used to access the audio data (among other information) in a manner that is linked to the file itself. As explained above, such data access information may be encoded in the encoded audio data. In order to determine the data access information (such as who has accessed the audio data and which devices were used to access the audio data) from the encoded audio data, it may be necessary to decode the encoded audio data. Decoding may refer to the process of extracting bits and/or bytes of data corresponding to the encoding data and reconstructing the bits and/or bytes to determine the encoding data, which may be used to determine the data access information desired.

Figure 6:
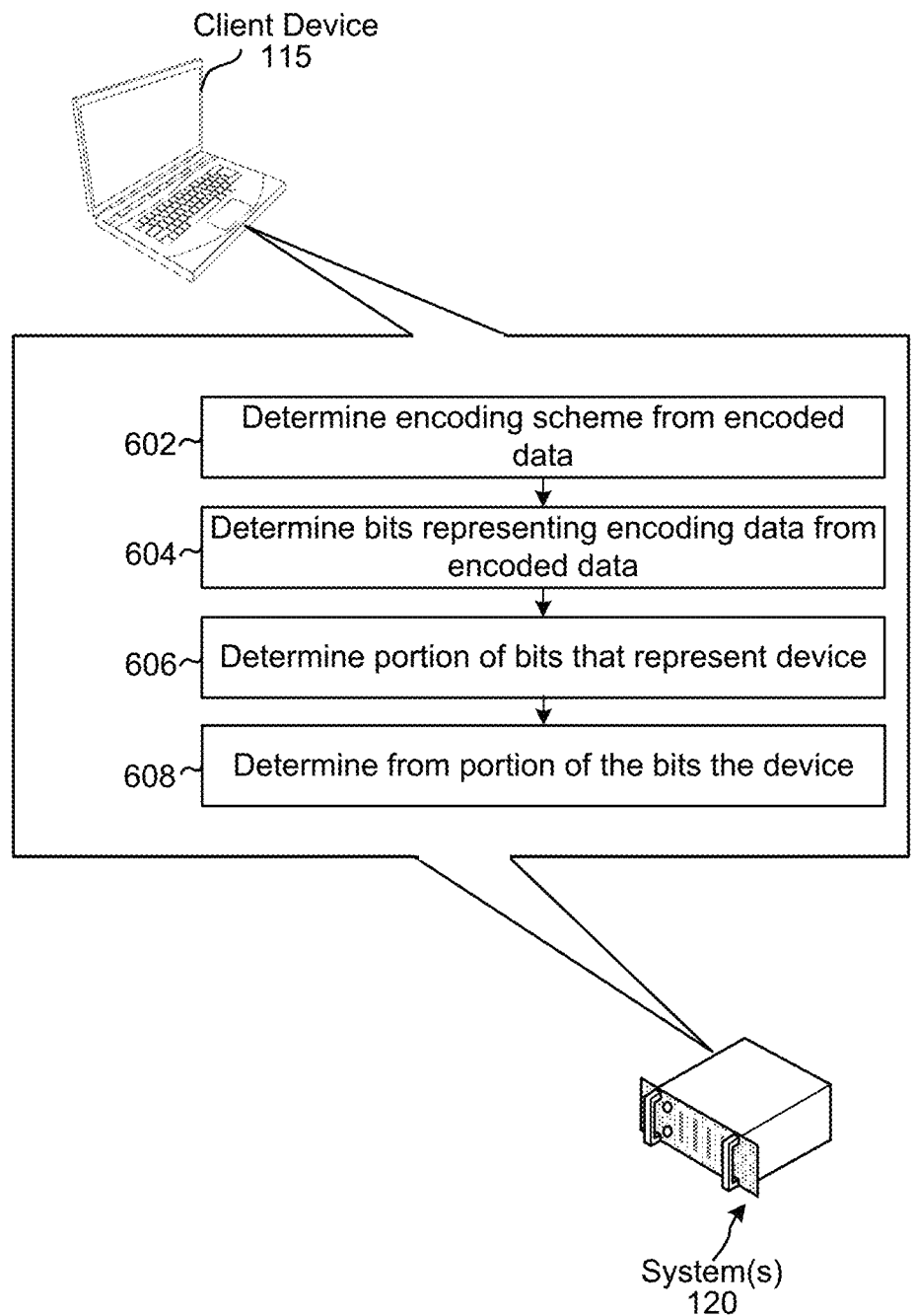
FIG. 6 is conceptual diagram illustrating example operations for decoding data, according to embodiments of the present disclosure.

Referring to FIG. 6, example operations for decoding the encoded audio data are shown. The encoded audio data may be decoded by the system(s) 120 or a client device, such as the client 204 (e.g., the laptop 115), that has received the encoded audio data. The system(s) 120 or the client 204 may determine (602) an encoding scheme from the encoded data (e.g., the encoded audio data). For example, the system(s) 120 or the client 204 may determine that the encoding scheme is, or is based on, a LSB algorithm. The system(s) 120 or the client 204 may determine the encoding scheme based on a bit or a portion of bits of the encoded audio data.

Referring to FIG. 3C, bytes of encoded audio data 316, 318, and 320 may include embedded bits of encoding data 322, 324, and 326, respectively. For example, the byte of encoded audio data 316 may include the bit of encoding data 322, shown as 0. Further, the byte of encoded audio data 318 may include the bit of encoding data 324, shown as 0. Also, the byte of encoded audio data 320 may include the bit of encoding data 326, shown as 1. Based on the encoding scheme, the system(s) 120 or the client 204 may determine (604) bits representing the encoding data from the encoded data (e.g., the encoded audio data). For example, based determining that the encoding scheme is, or is based on, a LSB algorithm, the system(s) 120 or the client 204 may determine bits 322, 324, and 326, representing the encoding data 308, from the encoded audio data 314.

This process may be referred to as extraction and may include reading the LSB of each byte of received data (e.g., audio data). For example, in the case of LSB extraction, the system(s) 120 or the client 204 may read the LSB of each byte of the encoded audio data 310. As indicated by FIG. 3C, the system(s) 120 or the client 204 may read and/or extract the LSB of the byte of encoded audio data 316, which may be the bit of encoding data 322, shown as 0. Further, the system(s) 120 or the client 204 may read and/or extract the LSB of the byte of encoded audio data 318, which may be the bit of encoding data 324, shown as 0. Also, the system(s) 120 or the client 204 may read and/or extract the LSB of the byte of encoded audio data 320, which may be the bit of encoding data 326, shown as 1. In this way, the system(s) 120 or the client 204 may read and/or extract the LSB of the bytes of encoded audio data 310 and reconstruct the encoding data 308, as indicated by reconstructed encoding data 328 (of FIG. 3C), shown as 00001001.

Portions of bits (e.g., one bit, two bits, three bits, etc.) of the encoding data may represent various types of data access information, other information, or a message. For example, if the encoding data includes eight bits, a first portion of the eight bits (e.g., one bit) may represent a message version. A second portion of the eight bits (e.g., two bits different than the first portion) may represent a key version. Further, a third portion of the eight bits (e.g., three bits different than the first and second portions) may represent a data type. The system(s) 120 or the client 204 may determine (606) a portion (e.g., the first, second, and/or third portions) of the bits that represent the client device (and/or a message version, a key version, a client, a source, a user, a timestamp, or a data type corresponding to the audio data). It should be noted that while the encoding data is show in FIGS. 3B and 3C as being one byte or eight bits in size and the audio data and encoded audio data are shown as being eight bytes in size, this is for illustrative purposes only and not intended to limit the present disclosure. In other words, the encoding data may be much greater than one byte or eighth bits in size and the audio data and the encoded audio data may be much greater than eight bytes in size. Thus, the portion or portions of bits referred to herein may be multiple bits or bytes long.

As discussed above, the encoded audio data may include one or more bits which describe the encoding scheme. For example, the encoded audio data at the Nth bit may indicate that the encoding scheme first encodes the client ID or may indicate that the encoding scheme first encodes the timestamp and then encodes the user ID. Thus, when decoding the encoded audio data, the system(s) 120 or the client 204 may determine (608), from the portion of the bits (e.g., the first, the second, or the third portion as described above), the client device (and/or the message version, the key version, the client, the source, the user, the timestamp, or the data type corresponding to the audio data). For example, the portion the bits (e.g., of the eighth bits or a greater number of bits or bytes depending on the size of the encoding data) may represent the client (e.g., a client device ID, a client ID, IP address, MAC address, etc.) and the system(s) 120 or the client 204 may determine (e.g., based on a mapping data such as a table, chart, list, etc.) that the portion of the bits correspond to the client ID (e.g., of a requesting client) of the and may identify the client based on the portion of the bits. The system may use the encoding scheme not only to determine which bits of the encoded data go with what information but also to identify the table, chart, or other data to interpret those bits (e.g., identify the client ID represented by the appropriate bits, or the like).

As discussed above, based on the encoding scheme used to encode the audio data or the encoded audio data itself, the system(s) 120 may cause the encoded audio data to be deleted from devices (e.g., client devices such as the client 204 or the laptop 115). In some implementations, this may include decoding the encoded audio data as described above. For example, once the encoding data is decoded or extracted from the encoded audio data, the systems 120 may cause the encoded audio data to be deleted from a device (e.g., the client 204 or the laptop 115) based on the data access information represented by the encoding data.

The data access information desired to be embedded in the audio data may be large in size. Example data access information (including, e.g., user ID, timestamp, data type, destination, etc.) may be packaged as <systemID>+<userID>+<timestamp>+<destination> and may be, for example 16-128 bytes in length. If the example data access information shown above is embedded into the audio data, it may require at least, for example 128-1024 (i.e., 16*8 to 128*8) bits of the original audio data. If the audio data is encoded using a LSB encoding mechanism as described above, the encoding may in turn alter 128-1024 individual bytes if one bit per byte is altered. If the sample rate of the audio data is 16 k, that may be less than 100 ms of audio data changed, depending on the number of channels that exist. The more data changed in audio data, the larger the distortion that the user may experience. Additionally, to encode data in large scale systems, a fixed length encoded message portion may be desirable to allow for a smooth extraction/decoding process.

If the example data access information is embedded as a connected string (e.g., <systemID>+<userID>+<timestamp>+<destination>) into the audio data, a relatively large number of bytes of the audio data may be impacted. In order to use fewer bytes but still have enough space to include all of the desired data access information, a short name mapping system may be incorporated. For example, the encoding scheme may designate portions (e.g., the first, the second, and/or the third portion as described above) of the encoding data that represent different types of data access information. Mapping data, such as a table, chart, list, etc. may indicate which portions of the bits or bytes of the encoded audio data correspond to various types of data access information described above and the portions of the bits or bytes may indicate the different types of data access information. An example mapping table is provided below in Table 1:

TABLE 1

| Data Access Information | Number of Bytes | Description |
| --- | --- | --- |
| Message Version | A Bytes | Version of message embedded |
| Key Version | B Bytes | Key used to encrypt embedded message |
| Client ID | C Bytes | Client requesting the audio data |

TABLE 1-continued

| Data Access Information | Number of Bytes | Description |
| --- | --- | --- |
| Source ID | D Bytes | Device that received original audio |
| User ID | E Bytes | User ID of user of requesting client |
| Timestamp | F Bytes | Time of request of audio data |
| Data type | G Bytes | Data type of content |

As shown in the table above, various types of data access information may be embedded into the audio data using a corresponding number of bytes A-G of the audio data. The data access information may be represented using a short name mapping system such that X number of bytes may be preserved for the encoding data. X number of bytes of encoding data may impact 8X number of bytes (X*8) of audio data. As can be appreciated, the size of the audio data may depend on the bit rate, bit depth, and length of sample. As can also be appreciated, the percentage of the raw audio data that may be replicated by the encoded data is also variable.

The encoded data may be encrypted to protect access to the encoded data. For example, it may be secured using a symmetric cipher that uses the same cryptographic key for both encryption and decryption. For example, a 128 bit AES (Advanced Encryption Standard) in CFB (Cipher FeedBack) mode may be used to secure the data access information.

In some embodiments, a unique ID (e.g., a 128 bit integer) may be created to represent the data access information. As discussed above, the data access information may describe how the underlying file or data (e.g., the audio data) was accessed and may include, for example, a client ID (e.g., of a client requesting the data), a message version (e.g., a watermarking version), a key version, a source ID (e.g., of a device that initially received or determined the data), a user (e.g., a user ID) of the user requesting access to the data (e.g., the user operating client device 115), a timestamp (e.g., when the data was requested or provided), and/or a data type of the data. The unique ID may be embedded in the audio data and may correspond to the data access information as stored in a database. Thus, the unique ID may be used to obtain the data access information from the database.

The system 100 may operate using various components as described in FIG. 7. The various components may be located on same or different physical devices. For example the components of system(s) 120 may be located on one or more remote device(s). Further, some or all of the components illustrated as part of system(s) 120 may be located on device 110 allowing the device to perform the operations of those components, depending on system configuration. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system(s) 120. In at least some embodiments, such determination may be made using a wakeword detection component 720. The device 110 may include multiple wakeword detection components 720a-720n, where each component is configured to detect a different wakeword. Alternatively (or in addition) a single wakeword detection component 720 may be configured to detect various wakewords. An example wakeword/digital assistant name is "Alexa." In at least some examples, each wakeword may correspond to a name of a different digital assistant. In another example, input to the system may be in form of text data 713, for example as a result of a user typing an input into a user interface of device 110. Other input forms may include indication that the user has pressed a physical or virtual button on device 110, the user has made a gesture, etc. The device 110 may also capture images using camera(s) 1118 of the device 110 and may send image data 721 representing those image(s) to the system(s) 120. The image data 721 may include raw image data or image data processed by the device 110 before sending to the system(s) 120.

The wakeword detector 720 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 720 and/or input is detected by an input detector, the device 110 may "wake" and begin transmitting audio data 711, representing the audio 11, to the system(s) 120. The audio data 711 may include data corresponding to the wakeword; in other embodiments, the portion of the audio corresponding to the wakeword is removed by the device 110 prior to sending the audio data 711 to the system(s) 120. In the case of touch input detection or gesture based input detection, the audio data may not include a wakeword.

In some implementations, the system 100 may include more than one system(s) 120. The systems 120 may respond to different wakewords and/or perform different categories of tasks. Each system(s) 120 may be associated with its own wakeword such that speaking a certain wakeword results in audio data be sent to and processed by a particular system. Further, each system(s) 120 may be associated with its own wakeword detector (e.g., 720a, 720b, etc.) depending on which wakeword is to be detected. For example, detection of the wakeword "Alexa" by the wakeword detector 720a may result in sending audio data to system(s) 120a for processing while detection of the wakeword "Computer" by the wakeword detector 720b may result in sending audio data to system(s) 120b for processing. The system may have a separate wakeword/wakeword detector 720 and system(s) 120 for different skills/systems (e.g., "Dungeon Master" for a game play skill/system(s) 120c) and/or such skills/systems may be coordinated by one or more skill(s) 790 of one or more systems 120.

Upon receipt by the system(s) 120, the audio data 711 may be sent to an orchestrator component 730. The orchestrator component 730 may include memory and logic that enables the orchestrator component 730 to transmit various pieces and forms of data to various components of the system, as well as perform other operations as described herein.

The orchestrator component 730 may send the audio data 711 to a language processing component 792. The language processing component 792 (sometimes also referred to as a spoken language understanding (SLU) component) includes an automatic speech recognition (ASR) component 750 and a natural language understanding (NLU) component 760. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to an NLU component 760, via, in some embodiments, the orchestrator component 730. The text data sent from the ASR component 750 to the NLU component 760 may include a single top-scoring ASR hypothesis or may include an N-best list including multiple top-scoring ASR hypotheses. An N-best list may additionally include a respective score associated with each ASR hypothesis represented therein. The ASR component 750 is described in greater detail below with regard to FIG. 2.

The speech processing system 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the device 110, the system(s) 120, a skill component 790, a skill system(s) 125, etc.) to execute the intent. For example, if the text data corresponds to "play the $5^{th}$ Symphony by Beethoven," the NLU component 760 may determine an intent that the system output music and may identify "Beethoven" as an artist/composer and "5th Symphony" as the piece of music to be played. For further example, if the text data corresponds to "what is the weather," the NLU component 760 may determine an intent that the system output weather information associated with a geographic location of the device 110. In another example, if the text data corresponds to "turn off the lights," the NLU component 760 may determine an intent that the system turn off lights associated with the device 110 or the user 5. However, if the NLU component 760 is unable to resolve the entity—for example, because the entity is referred to by anaphora such as "this song" or "my next appointment"—the speech processing system 792 can send a decode request to another speech processing system 792 for information regarding the entity mention and/or other context related to the utterance. The speech processing system 792 may augment, correct, or base results data upon the audio data 711 as well as any data received from the other speech processing system 792.

The NLU component 760 may return NLU results data (which may include tagged text data, indicators of intent, etc.) back to the orchestrator 730. The orchestrator 730 may forward the NLU results data to a skill component(s) 790. If the NLU results data includes a single NLU hypothesis, the NLU component 760 and the orchestrator component 730 may direct the NLU results data to the skill component(s) 790 associated with the NLU hypothesis. If the NLU results data includes an N-best list of NLU hypotheses, the NLU component 760 and the orchestrator component 730 may direct the top scoring NLU hypothesis to a skill component(s) 790 associated with the top scoring NLU hypothesis.

A skill component may be software running on the system(s) 120 that is akin to a software application. That is, a skill component 790 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 790. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 790 may operate in conjunction between the system(s) 120 and other devices, such as the device 110, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

A skill support system(s) 125 may communicate with a skill component(s) 790 within the system(s) 120 and/or directly with the orchestrator component 730 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 790 dedicated to interacting with the skill support system(s) 125. Unless expressly stated otherwise, reference to a skill, skill device, or skill component may include a skill component 790 operated by the system(s) 120 and/or skill operated by the skill support system(s) 125. Moreover, the functionality described herein as a skill or skill may be referred to using many different terms, such as an action, bot, app, or the like. The skill 790 and or skill support system(s) 125 may return output data to the orchestrator 730.

The system(s) 120 includes a language output component 793. The language output component 793 includes a natural language generation (NLG) component 779 and a text-to-speech (TTS) component 780. The NLG component 779 can generate text for purposes of TTS output to a user. For example the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS component 780. Alternatively or in addition, the TTS component 780 may receive text data from a skill 790 or other system component for output.

The NLG component 779 may include a trained model. The NLG component 779 generates text data from dialog data received by a dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 780.

The TTS component 780 may generate audio data (e.g., synthesized speech) from text data using one or more different methods. Text data input to the TTS component 780 may come from a skill component 790, the orchestrator component 730, or another component of the system. In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 711 representing the commands to the system(s) 120 for processing, after which the system(s) 120 may return output data that can cause the device 110 to engage its camera.

Figure 8:
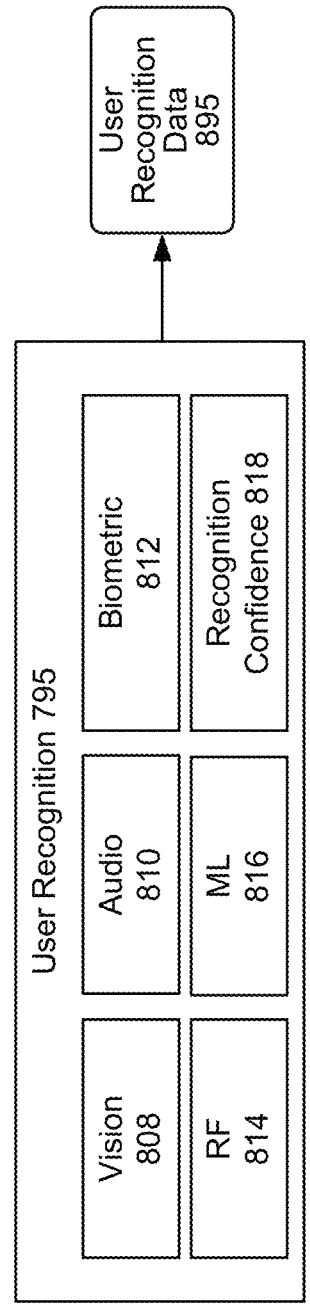
FIG. 8 is a schematic diagram of an illustrative architecture in which sensor data is combined to recognize one or more users according to embodiments of the present disclosure.

The system(s) 120 may include a user recognition component 795 (which may be located on the device 110 or otherwise) that recognizes one or more users using a variety of data, as described in greater detail below with regard to FIGS. 8-9.

The user-recognition component 795 may take as input the audio data 711 and/or text data output by the ASR component 750. The user-recognition component 795 may perform user recognition by comparing audio characteristics in the audio data 711 to stored audio characteristics of users. The user-recognition component 795 may also perform user recognition by comparing biometric data (e.g., fingerprint data, iris data, etc.), received by the system in correlation with the present user input, to stored biometric data of users assuming user permission and previous authorization. The user-recognition component 795 may further perform user recognition by comparing image data (e.g., including a representation of at least a feature of a user), received by the system in correlation with the present user input, with stored image data including representations of features of different users. The user-recognition component 795 may perform additional user recognition processes, including those known in the art.

The user-recognition component 795 determines scores indicating whether user input originated from a particular user. For example, a first score may indicate a likelihood that the user input originated from a first user, a second score may indicate a likelihood that the user input originated from a second user, etc. The user-recognition component 795 also determines an overall confidence regarding the accuracy of user recognition operations.

Output of the user-recognition component 795 may include a single user identifier corresponding to the most likely user that originated the user input. Alternatively, output of the user-recognition component 795 may include an N-best list of user identifiers with respective scores indicating likelihoods of respective users originating the user input. The output of the user-recognition component 795 may be used to inform NLU processing as well as processing performed by other components of the system.

The system 100 (either on device 110, system(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system(s) 120 with permission to allow the skill to execute with respect to the user's natural language user inputs. If a user does not enable a skill, the system(s) 120 may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 775 that may be configured to detect a sentiment of a user from audio data representing speech/utterances from the user, image data representing an image of the user, and/or the like as described in greater detail below with regard to FIG. 10. The sentiment detection component 775 may be included in system(s) 120, as illustrated in FIG. 7, although the disclosure is not limited thereto and the sentiment detection component 775 may be included in other components without departing from the disclosure. For example the sentiment detection component 775 may be included in the device 110, as a separate component, etc.

The device 110 and/or the system(s) 120 may include a user recognition component 795 that recognizes one or more users using a variety of data. As illustrated in FIG. 8, the user recognition component 795 may include one or more subcomponents including a vision component 808, an audio component 810, a biometric component 812, a radio frequency (RF) component 814, a machine learning (ML) component 816, and a recognition confidence component 818. In some instances, the user recognition component 795 may monitor data and determinations from one or more subcomponents to determine an identity of one or more users associated with data input to the device 110 and/or the system(s) 120. The user recognition component 795 may output user recognition data 895, which may include a user identifier associated with a user the user recognition component 795 determines originated data input to the device 110 and/or the system(s) 120. The user recognition data 895 may be used to inform processes performed by various components of the device 110 and/or the system(s) 120.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user recognition component 795 may utilize determinations from additional components to determine an identity of a user. The vision component 808 can be used in conjunction with other components to determine an identity of a user. For example, the user recognition component 795 may use data from the vision component 808 with data from the audio component 810 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user. Biometric information output by the biometric component 812 can be associated with specific user profile data such that the biometric information uniquely identifies a user profile of a user.

The radio frequency (RF) component 814 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 816 may track the behavior of various users as a factor in determining a confidence level of the identity of the user. By way of example, a user may adhere to a regular schedule such that the user is at a first location during the day (e.g., at work or at school). In this example, the ML component 816 would factor in past behavior and/or trends in determining the identity of the user that provided input to the device 110 and/or the system(s) 120. Thus, the ML component 816 may use historical data and/or usage patterns over time to increase or decrease a confidence level of an identity of a user.

In at least some instances, the recognition confidence component 818 receives determinations from the various components 808, 810, 812, 814, and 816, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 895.

The audio component 810 may receive data from one or more sensors capable of providing an audio signal (e.g., one or more microphones) to facilitate recognition of a user. The audio component 810 may perform audio recognition on an audio signal to determine an identity of the user and associated user identifier. In some instances, aspects of device 110 and/or the system(s) 120 may be configured at a computing device (e.g., a local server). Thus, in some instances, the audio component 810 operating on a computing device may analyze all sound to facilitate recognition of a user. In some instances, the audio component 810 may perform voice recognition to determine an identity of a user.

The audio component 810 may also perform user identification based on audio data 711 input into the device 110 and/or the system(s) 120 for speech processing. The audio component 810 may determine scores indicating whether speech in the audio data 711 originated from particular users. For example, a first score may indicate a likelihood that speech in the audio data 711 originated from a first user associated with a first user identifier, a second score may indicate a likelihood that speech in the audio data 711 originated from a second user associated with a second user identifier, etc. The audio component 810 may perform user recognition by comparing speech characteristics represented in the audio data 711 to stored speech characteristics of users (e.g., stored voice profiles associated with the device 110 that captured the spoken user input).

Figure 9:
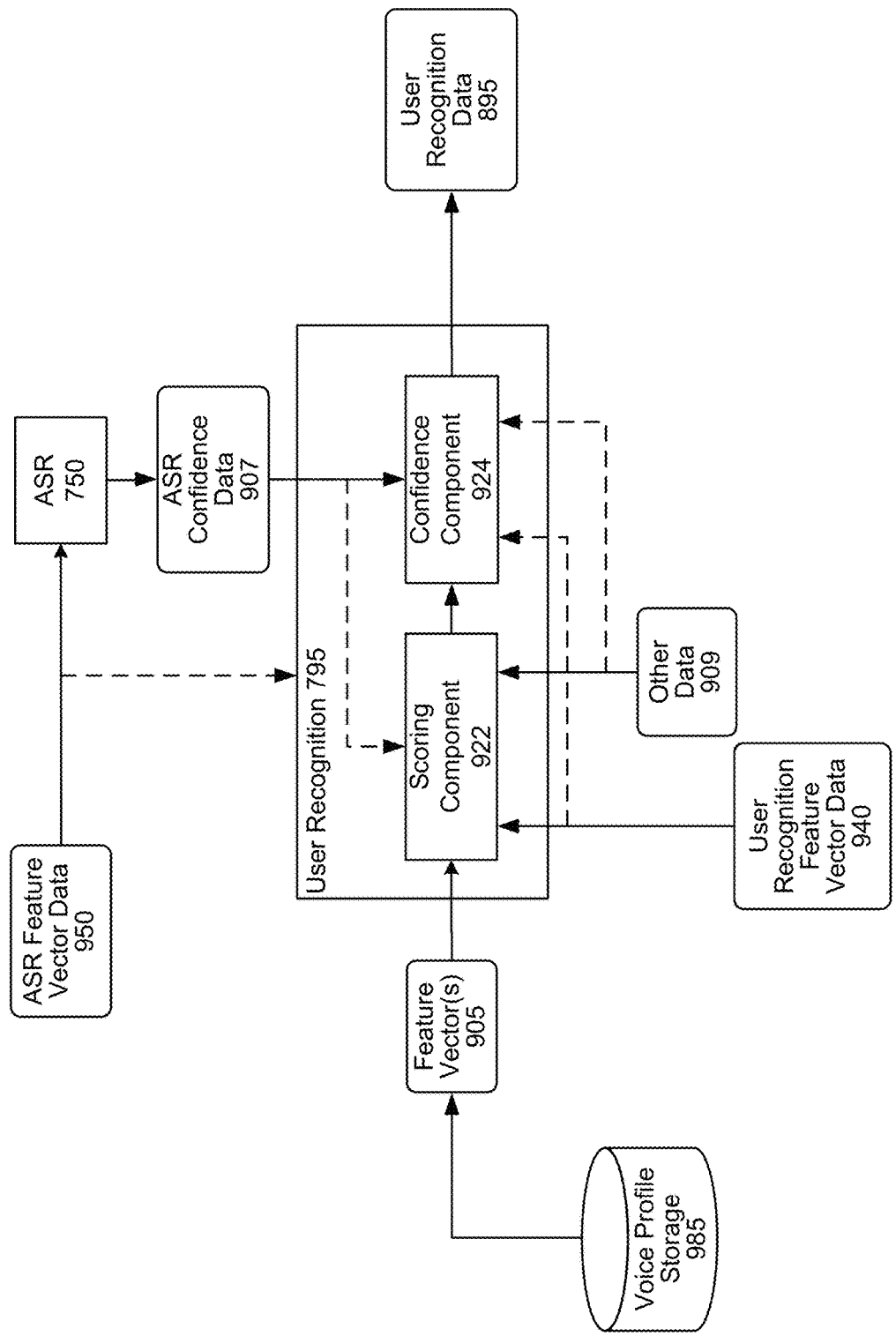
FIG. 9 is a system flow diagram illustrating user recognition according to embodiments of the present disclosure.

FIG. 9 illustrates user recognition processing as may be performed by the user recognition component 795. The ASR component 750 performs ASR processing on ASR feature vector data 950. ASR confidence data 907 may be passed to the user recognition component 795.

The user recognition component 795 performs user recognition using various data including the user recognition feature vector data 940, feature vectors 905 representing voice profiles of users of the system 100, the ASR confidence data 907, and other data 909. The user recognition component 795 may output the user recognition data 895, which reflects a certain confidence that the user input was spoken by one or more particular users. The user recognition data 895 may include one or more user identifiers (e.g., corresponding to one or more voice profiles). Each user identifier in the user recognition data 895 may be associated with a respective confidence value, representing a likelihood that the user input corresponds to the user identifier. A confidence value may be a numeric or binned value.

The feature vector(s) 905 input to the user recognition component 795 may correspond to one or more voice profiles. The user recognition component 795 may use the feature vector(s) 905 to compare against the user recognition feature vector 940, representing the present user input, to determine whether the user recognition feature vector 940 corresponds to one or more of the feature vectors 905 of the voice profiles. Each feature vector 905 may be the same size as the user recognition feature vector 940.

To perform user recognition, the user recognition component 795 may determine the device 110 from which the audio data 711 originated. For example, the audio data 711 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 940 produced from the audio data 711. The user recognition component 795 may send a signal to voice profile storage 985, with the signal requesting only audio data and/or feature vectors 905 (depending on whether audio data and/or corresponding feature vectors are stored) associated with the device identifier, the group profile identifier, and/or the user identifiers represented in the metadata. This limits the universe of possible feature vectors 905 the user recognition component 795 considers at runtime and thus decreases the amount of time to perform user recognition processing by decreasing the amount of feature vectors 905 needed to be processed. Alternatively, the user recognition component 795 may access all (or some other subset of) the audio data and/or feature vectors 905 available to the user recognition component 795. However, accessing all audio data and/or feature vectors 905 will likely increase the amount of time needed to perform user recognition processing based on the magnitude of audio data and/or feature vectors 905 to be processed.

If the user recognition component 795 receives audio data from the voice profile storage 985, the user recognition component 795 may generate one or more feature vectors 905 corresponding to the received audio data.

The user recognition component 795 may attempt to identify the user that spoke the speech represented in the audio data 711 by comparing the user recognition feature vector 940 to the feature vector(s) 905. The user recognition component 795 may include a scoring component 922 that determines respective scores indicating whether the user input (represented by the user recognition feature vector 940) was spoken by one or more particular users (represented by the feature vector(s) 905). The user recognition component 795 may also include a confidence component 924 that determines an overall accuracy of user recognition processing (such as those of the scoring component 922) and/or an individual confidence value with respect to each user potentially identified by the scoring component 922. The output from the scoring component 922 may include a different confidence value for each received feature vector 905. For example, the output may include a first confidence value for a first feature vector 905a (representing a first voice profile), a second confidence value for a second feature vector 905b (representing a second voice profile), etc. Although illustrated as two separate components, the scoring component 922 and the confidence component 924 may be combined into a single component or may be separated into more than two components.

The scoring component 922 and the confidence component 924 may implement one or more trained machine learning models (such as neural networks, classifiers, etc.) as known in the art. For example, the scoring component 922 may use probabilistic linear discriminant analysis (PLDA) techniques. PLDA scoring determines how likely it is that the user recognition feature vector 940 corresponds to a particular feature vector 905. The PLDA scoring may generate a confidence value for each feature vector 905 considered and may output a list of confidence values associated with respective user identifiers. The scoring component 922 may also use other techniques, such as GMMs, generative Bayesian models, or the like, to determine confidence values.

The confidence component 924 may input various data including information about the ASR confidence 907, speech length (e.g., number of frames or other measured length of the user input), audio condition/quality data (such as signal-to-interference data or other metric data), fingerprint data, image data, or other factors to consider how confident the user recognition component 795 is with regard to the confidence values linking users to the user input. The confidence component 924 may also consider the confidence values and associated identifiers output by the scoring component 922. For example, the confidence component 924 may determine that a lower ASR confidence 907, or poor audio quality, or other factors, may result in a lower confidence of the user recognition component 795. Whereas a higher ASR confidence 907, or better audio quality, or other factors, may result in a higher confidence of the user recognition component 795. Precise determination of the confidence may depend on configuration and training of the confidence component 924 and the model(s) implemented thereby. The confidence component 924 may operate using a number of different machine learning models/techniques such as GMM, neural networks, etc. For example, the confidence component 924 may be a classifier configured to map a score output by the scoring component 922 to a confidence value.

The user recognition component 795 may output user recognition data 895 specific to a one or more user identifiers. For example, the user recognition component 795 may output user recognition data 895 with respect to each received feature vector 905. The user recognition data 895 may include numeric confidence values (e.g., 0.0-1.0, 0-1000, or whatever scale the system is configured to operate). Thus, the user recognition data 895 may output an n-best list of potential users with numeric confidence values (e.g., user identifier 123—0.2, user identifier 234—0.8). Alternatively or in addition, the user recognition data 895 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 795 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 895 may only include information related to the top scoring identifier as determined by the user recognition component 795. The user recognition component 795 may also output an overall confidence value that the individual confidence values are correct, where the overall confidence value indicates how confident the user recognition component 795 is in the output results. The confidence component 924 may determine the overall confidence value.

The confidence component 924 may determine differences between individual confidence values when determining the user recognition data 895. For example, if a difference between a first confidence value and a second confidence value is large, and the first confidence value is above a threshold confidence value, then the user recognition component 795 is able to recognize a first user (associated with the feature vector 905 associated with the first confidence value) as the user that spoke the user input with a higher confidence than if the difference between the confidence values were smaller.

The user recognition component 795 may perform thresholding to avoid incorrect user recognition data 895 being output. For example, the user recognition component 795 may compare a confidence value output by the confidence component 924 to a threshold confidence value. If the confidence value does not satisfy (e.g., does not meet or exceed) the threshold confidence value, the user recognition component 795 may not output user recognition data 895, or may only include in that data 895 an indicator that a user that spoke the user input could not be recognized. Further, the user recognition component 795 may not output user recognition data 895 until enough user recognition feature vector data 940 is accumulated and processed to verify a user above a threshold confidence value. Thus, the user recognition component 795 may wait until a sufficient threshold quantity of audio data of the user input has been processed before outputting user recognition data 895. The quantity of received audio data may also be considered by the confidence component 924.

The user recognition component 795 may be defaulted to output binned (e.g., low, medium, high) user recognition confidence values. However, such may be problematic in certain situations. For example, if the user recognition component 795 computes a single binned confidence value for multiple feature vectors 905, the system may not be able to determine which particular user originated the user input. In this situation, the user recognition component 795 may override its default setting and output numeric confidence values. This enables the system to determine a user, associated with the highest numeric confidence value, originated the user input.

The user recognition component 795 may use other data 909 to inform user recognition processing. A trained model(s) or other component of the user recognition component 795 may be trained to take other data 909 as an input feature when performing user recognition processing. Other data 909 may include a variety of data types depending on system configuration and may be made available from other sensors, devices, or storage. The other data 909 may include a time of day at which the audio data 711 was generated by the device 110 or received from the device 110, a day of a week in which the audio data audio data 711 was generated by the device 110 or received from the device 110, etc.

The other data 909 may include image data or video data. For example, facial recognition may be performed on image data or video data received from the device 110 from which the audio data 711 was received (or another device). Facial recognition may be performed by the user recognition component 795. The output of facial recognition processing may be used by the user recognition component 795. That is, facial recognition output data may be used in conjunction with the comparison of the user recognition feature vector 940 and one or more feature vectors 905 to perform more accurate user recognition processing.

The other data 909 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 909 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 711 was received is a smart watch or vehicle belonging to a user A, the fact that the device 110 belongs to user A may increase a user recognition confidence value associated with user A and/or decrease a user recognition confidence value associated with user B.

The other data 909 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 711. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 909 may include data representing activity of a particular user that may be useful in performing user recognition processing. For example, a user may have recently entered a code to disable a home security alarm. A device 110, represented in a group profile associated with the home, may have generated the audio data 711. The other data 909 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 909 and considered by the user recognition component 795.

Depending on system configuration, the other data 909 may be configured to be included in the user recognition feature vector data 940 so that all the data relating to the user input to be processed by the scoring component 922 may be included in a single feature vector. Alternatively, the other data 909 may be reflected in one or more different data structures to be processed by the scoring component 922.

Figure 10:
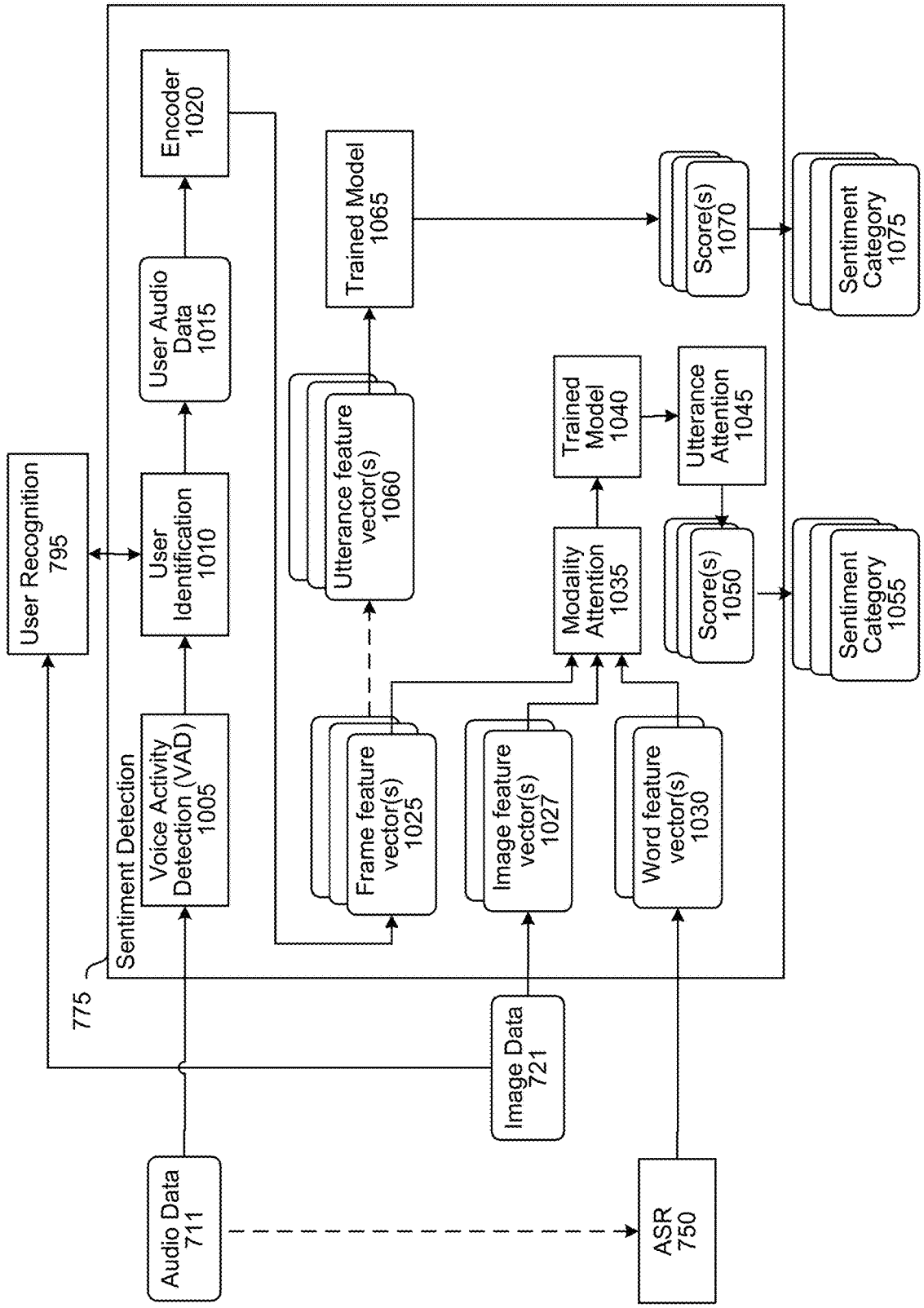
FIG. 10 is a conceptual diagram illustrating a sentiment detection component according to embodiments of the present disclosure.

FIG. 10 is a conceptual diagram illustrating sentiment detection component 775 according to embodiments of the present disclosure. The sentiment detection component 775 may determine a user sentiment based on audio data 711, image data 711, and other data. Although certain configurations/operations of the sentiment detection component 775 are illustrated in FIG. 10 and described herein, other techniques/configurations of sentiment detection may be used depending on system configuration.

The sentiment detection component 775 may include a voice activity detection (VAD) component 1005, a user identification component 1010, an encoder component 1020, a modality attention layer 1035, a trained model component 1040, an utterance attention layer 1045, and a trained model component 1065. The audio data 711 captured by a device 110 may be inputted into the VAD component 1005. The VAD component 1005 may determine if the audio data 711 includes speech spoken by a human or voice activity by a human, and may determine a portion of the audio data 711 that includes speech or voice activity. The VAD component 1005 may send the portion of the audio data 711 including speech or voice activity to the user identification component 1010. The VAD component 1005 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 1005 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 1010 may communicate with the user recognition component 795 to determine user audio data 1015 that corresponds to a particular user profile. The user recognition component 795 may recognize one or more users as described in connection with FIGS. 8 and 9. The user audio data 1015 may be a portion of the audio data 711 that includes speech or one or more utterances from a particular user associated with the user profile. In other words, audio data representing a particular user's speech may be isolated and stored as the user audio data 1015 for further analysis. In an example embodiment, the user may be associated with or using the device 110, and may have provided permission to the system 100 to record and analyze his or her voice/conversations to determine a sentiment category corresponding to the conversation.

The user audio data 1015 may be input into the encoder component 1020 to determine frame feature vector(s) 1025. The encoder component 1020 may be a bidirectional LSTM. The frame feature vector(s) 1025 may represent audio frame level features extracted from the user audio data 1015. One frame feature vector 1025 may represent audio frame level features for an audio frame of 20 ms of the user audio data 1015. The frame feature vector(s) 1025 may be derived by spectral analysis of the user audio data 1015. The sentiment detection component 775 may determine the portions of user audio data 1015 that correspond to individual words and may extract acoustic features from the respective portions of audio using the encoder component 1020.

In some embodiments, the frame feature vector(s) 1025 may be used to determine utterance feature vector(s) 1060 representing utterance-level features of one or more utterances represented in the user audio data 1015. The utterance feature vector(s) 1060 may be determined by performing statistics calculations, delta calculation and other processing on the frame feature vector(s) 1025 for the audio frames corresponding to an utterance of interest. As such, the utterance feature vector(s) 1060 may be a feature matrix whose dimensions are based on the number of audio frames corresponding to the utterance of interest and the dimension of the corresponding frame feature vector 1025. The utterance feature vector(s) 1060 may be a high-level function or other mathematical functions representing the utterance-level features.

The ASR component 750, as described above, may generate ASR output data, for example including text data representative of one or more utterances represented in the audio data 711. In some examples, the system sends audio data 711 to the ASR component 750 for processing. In other examples, the system sends user audio data 1015 to the ASR component 750 for processing. The ASR output may be represented as word feature vector(s) 1030, where each word feature vector 1030 may correspond to a word in the text data determined by the ASR component 750 and may represent lexical information of the utterance. The word feature vector 1030 may be a word embedding.

In an example embodiment, the sentiment detection component 775 determines that the user audio data 1015 includes an entire utterance. That is, the sentiment detection component 775 may determine that a beginpoint of the user audio data 1015 corresponds to a beginpoint of an utterance, and an endpoint of the user audio data 1015 corresponds to an endpoint of the utterance. In this case, the frame feature vector(s) 1025 and the word feature vector(s) 1030 may represent all the words in one utterance.

The sentiment detection component 775 may also input image data 711 which may come from still images, an image feed of video data, or the like for example from one or more cameras of device 110 or otherwise. The image data 711 may include a representation of a user which the system may analyze to determine the user's sentiment. Image data 711 may be processed by an encoder (not illustrated) to determine image feature vector(s) 1027. Such an encoder may be included as part of sentiment detection component 775 or may be located separately, in which case image feature vector(s) 1027 may be input into sentiment detection component 775 in addition to or instead of image data 711. The image data/feature vectors may be analyzed separately by sentiment detection component 775 if audio data/ASR data is unavailable. The image data/feature vectors may also be analyzed in conjunction with the audio data/ASR output data.

The sentiment detection component 775 may align a frame feature vector 1025 with a corresponding word feature vector 1030 such that the pair represents acoustic information and lexical information, respectively, for an individual word in the utterance represented in user audio data 1015. The sentiment detection component 775 may similarly align one or more image feature vector(s) 1027 with one or more frame feature vector(s) 1025 and/or corresponding word feature vector(s) 1030 so the appropriate image(s) are matched with the frames/ASR output data thus allowing the system to consider the audio, content and image of the user talking when performing sentiment analysis. The frame feature vectors 1025, image feature vector(s) 1027, and the word feature vectors 1030 may be processed by the trained model 1040 simultaneously.

The trained model 1040 may process the frame feature vector(s) 1025 and corresponding word feature vector(s) 1030 using a machine learning model. In some embodiments, the sentiment detection component 775 includes a modality attention component 1035 configured to determine how much acoustic information versus how much lexical information versus how much image information from the respective feature vectors 1025/1027/1030 should be used by the trained model 1040. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 1035 may assign a weight or percentage to the data represented by the acoustic feature vectors, the data represented by the image feature vectors, and the data represented by the lexical feature vectors to indicate the importance of each to the trained model 1040.

The trained model 1040 may be a neural network, for example a bi-directional LSTM. The output of the trained model 1040 may be fed into an utterance attention component 1045. The utterance attention component 1045 may employ a neural network, for example a recurrent neural network, although the disclosure is not limited thereto. The utterance attention component 1045 may be configured to emphasize relevant portions of an input utterance. The utterance attention component 1045 may be configured to take in output data from the trained model 1040 and produce an output for every time step (e.g., a 10 ms audio frame). The utterance attention component 1045 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 1045 is configured to realize that the first word corresponds to an anger sentiment and that that should affect the processing of the other words in the utterance to ultimately determine a sentiment category corresponding to the utterance.

The utterance attention component 1045 may output score(s) 1050 indicating a sentiment category 1055 for the user audio data 1015. The sentiment detection component 775 may predict from multiple sentiment categories, including but not limited to, happiness, sadness, anger and neutral. In an example embodiment, the sentiment category 1055 may be determined after score(s) 1050 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 775 is configured to determine a sentiment category 1075 at an utterance-level. The sentiment detection component 775 may use contextual information from the entire utterance to determine an overall sentiment of the speaker when speaking the utterance. The sentiment detection component 775 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 775 may be configured to determine a sentiment category on a word level (that is for each word within an utterance).

As illustrated in FIG. 10, the trained model component 1065 may process the utterance feature vector(s) 1060 using a fully-connected neural network trained using techniques known to one of skill in the art. The trained model component 1065 may output score(s) 1070 indicating a sentiment category 1075 for the user audio data 1015.

The sentiment detection component 775 may predict one of three sentiment categories 1055/1075. In some examples, the sentiment categories 1055/1075 may be positive, neutral, and negative. However, the disclosure is not limited thereto, and in other examples the sentiment categories 1055/1075 may be angry, neutral (e.g., neutral/sad), and happy without departing from the disclosure. Additionally or alternatively, the sentiment detection component 775 may predict any number of sentiment categories 1055/1075 without departing from the disclosure. For example, the sentiment detection component 775 may predict one of four sentiment categories 1055/1075, such as angry, sad, neutral, and happy, although the disclosure is not limited thereto.

The machine learning model for the trained model component 1040/1065 may take many forms, including a neural network. The trained model component 1040/1065 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 11:
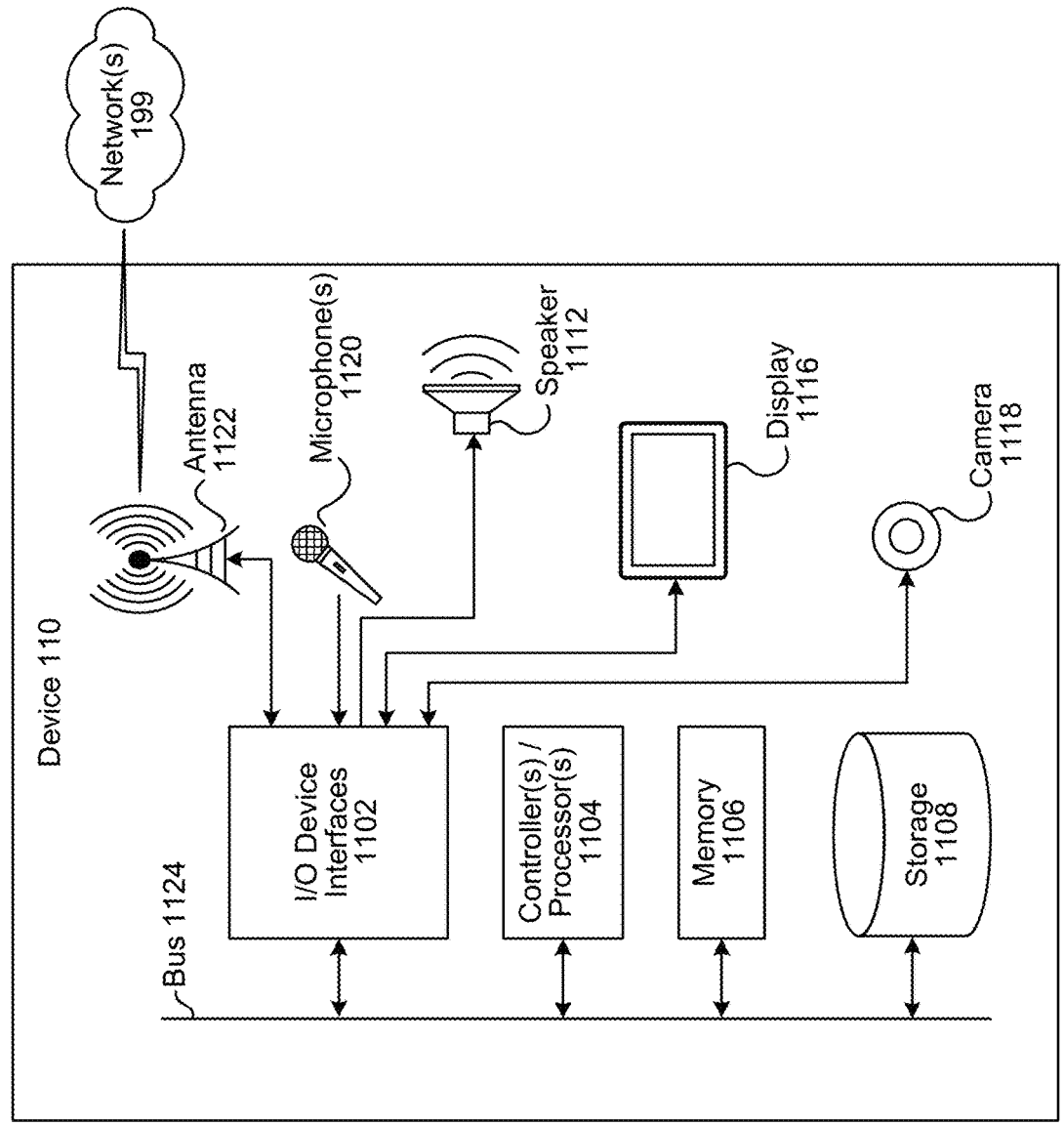
FIG. 11 is a block diagram conceptually illustrating example components of a device, according to embodiments of the present disclosure.
Figure 12:
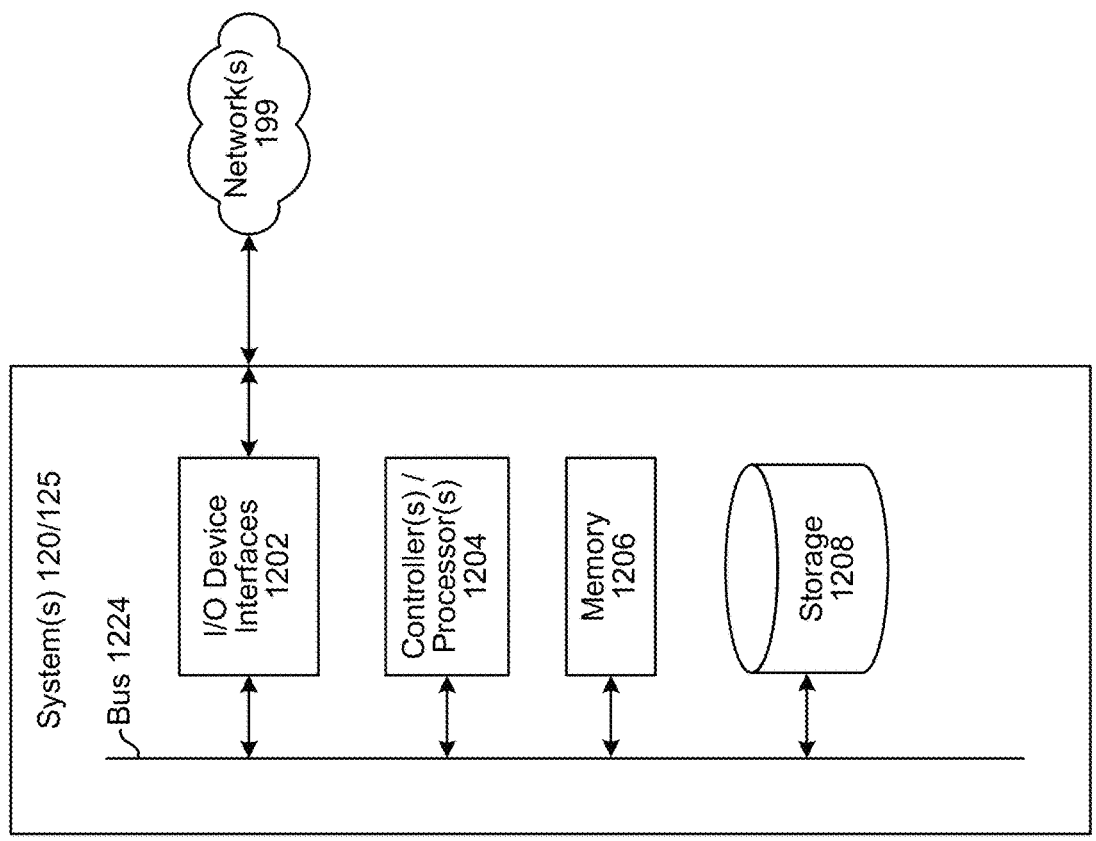
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system(s) 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system(s) 120, or a skill system 125 may include their own dedicated processors, memory, and/or storage. Alternatively, one or more of the components of the device(s) 110, the natural language command processing system(s) 120, or a skill system 125 may utilize the I/O interfaces (1102/1202), processor(s) (1104/1204), memory (1106/1206), and/or storage (1108/1208) of the device(s) 110, natural language command processing system(s) 120, or the skill system 125, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system(s) 120, and a skill system 125, as described herein, are illustrative, and may be located as a stand-alone device or may be included, in whole or in part, as a component of a larger device or system.

Figure 13:
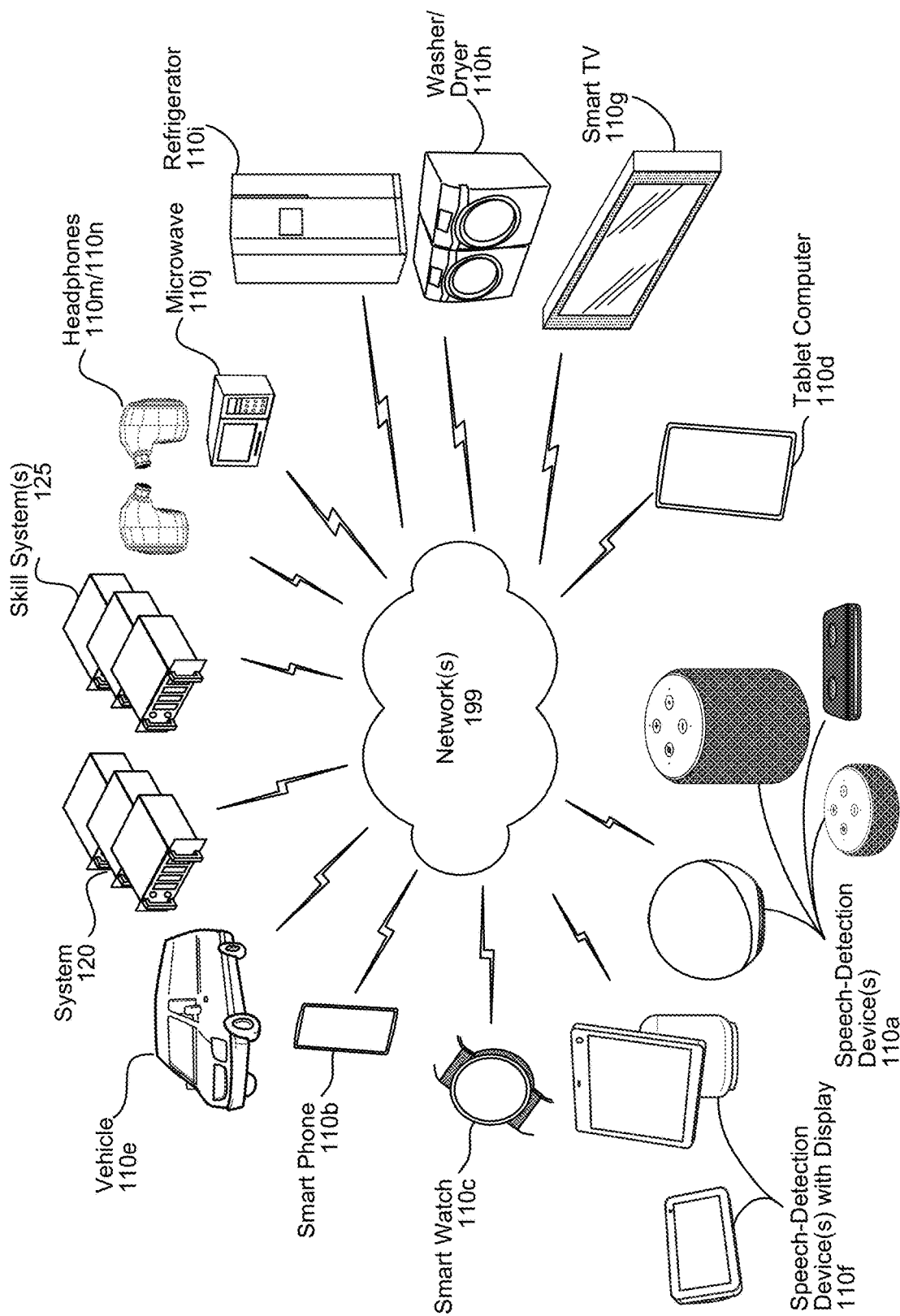
FIG. 13 illustrates an example of a computer network for use with the overall system, according to embodiments of the present disclosure.

As illustrated in FIG. 13, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, etc. (e.g., a device such as a FireTV stick, Echo Auto or the like) may be connected to the network(s) 199 through a wireless service provider, over a WiFi or cellular network connection, or the like. Other devices are included as network-connected support devices, such as the natural language command processing system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the natural language command processing system(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, a first request for access to audio data;
determining, using first policy data, that the first device is authorized to access the audio data;
determining that the audio data represents speech captured by a user device;
in response to the audio data representing speech, determining, using second policy data, that the audio data is to be encoded according to a first encoding scheme, the first encoding scheme using a least significant bit algorithm;
receiving the audio data from data storage;
based at least in part on the first encoding scheme and the first device, determining first encoding data representing a device identifier of the first device;
using the first encoding scheme to determine a first portion of the audio data to be overwritten to allow insertion of the first encoding data;
using the audio data to determine first encoded audio data representing the speech, the first encoded audio data including the first encoding data instead of the first portion of the audio data; and sending, to the first device, the first encoded audio data.

2. The computer-implemented method of claim 1, further comprising:

determining a first bit position of the audio data, the first bit position corresponding to a least-significant bit of a first byte of the audio data; and determining a second byte of the first encoded audio data by inserting, into the first bit position, a value corresponding to a bit of the first encoding data.

3. The computer-implemented method of claim 1, further comprising:

receiving, from a second device, a second request for the audio data;

determining, using the first policy data, that the second device is authorized to access the audio data;

based at least in part on the first encoding scheme and the second device, determining second encoding data representing at least the second device;

using the first encoding scheme and the first encoded audio data to determine second encoded audio data representing the speech, the second encoded audio data including the second encoding data located after the first encoding data within the second encoded audio data; and sending, to the second device, the second encoded audio data.

4. The computer-implemented method of claim 1, further comprising:

determining the first encoding scheme corresponding to the first encoded audio data;

based at least in part on the first encoding scheme, determining bits of the first encoded audio data representing encoding data;

based at least in part on the first encoding scheme, determining a first portion of the bits that represent, at least in part, the first device; and determining, from the first portion of the bits, an identifier corresponding to the first device.

5. A computer-implemented method comprising:

receiving a first request for first data to be sent to a first device, the first data having been stored in a storage medium prior to receipt of the first request;

determining that the first data is to be encoded according to a first encoding scheme prior to being sent to the first device;

generating second data representing at least a first attribute of the first request;

receiving the first data from the storage medium;

after receiving the first data, generating first encoded data using the first encoding scheme, the second data, and the first data, the first encoded data representing at least the second data and at least a portion of the first data; and causing the first encoded data to be sent to the first device.

6. The computer-implemented method of claim 5, wherein the second data represents, at least in part, the first device.

7. The computer-implemented method of claim 6, further comprising:

determining the first encoding scheme corresponding to the first encoded data;

based at least in part on the first encoding scheme, determining a first plurality of bits of the first encoded data representing the first device; and determining, using the first plurality of bits, an identifier corresponding to the first device.

8. The computer-implemented method of claim 7, wherein determining the first encoding scheme comprises:

determining a second plurality of bits of the first encoded data that represent, at least in part, the first encoding scheme.

9. The computer-implemented method of claim 7, further comprising:

determining, using the first encoding scheme, mapping data indicating information represented by the first encoded data.

10. The computer-implemented method of claim 5, further comprising:

receiving, from a second device, a second request for the first data;

determining that the second device is authorized to access the first data;

generating third data representing at least a second attribute of the second request;

receiving the first encoded data; and after receiving the first encoded data, generating second encoded data using the first encoding scheme, the third data, and the first encoded data, the second encoded data representing at least the third data and at least a portion of the first encoded data, wherein the second encoded data is generated at least in part by overwriting the second data represented in the first encoded data with the third data.

11. The computer-implemented method of claim 5, further comprising:

receiving, from a second device, a second request for the first data;

determining that the second device is authorized to access the first data;

generating third data representing at least a second attribute of the second request;

receiving the first encoded data; and after receiving the first encoded data, generating second encoded data using the first encoding scheme, the third data, and the first encoded data, the second encoded data representing at least the third data, the second data, and at least a portion of the first data.

12. The computer-implemented method of claim 5, further comprising:

storing third data indicating that the first encoded data corresponds to the first data and the first device.

13. The computer-implemented method of claim 5, wherein the second data is positioned in the first encoded data based at least in part on the first encoding scheme, the first encoding scheme indicating a first bit position to be overwritten.

14. The computer-implemented method of claim 5, further comprising:

detecting, by a user device, audio corresponding to speech;

determining audio data corresponding to the audio, wherein the first data includes the audio data; and sending, from the user device, the first encoded data, wherein generating the first encoded data is performed by the user device.

15. The computer-implemented method of claim 14, further comprising:

determining, based at least in part on the audio data, an identifier of a user that uttered the speech; and including a representation of the identifier in the second data.

16. The computer-implemented method of claim 14, further comprising:
    detecting, based at least in part on the audio, a wakeword included in the speech; and
    including a representation of the wakeword in the second data.

17. The computer-implemented method of claim 14, further comprising:
    determining sentiment data corresponding to the speech; and
    including a representation of the sentiment data in the second data.

18. A system comprising:
    at least one processor; and
    at least one memory including instructions operable to be executed by the at least one processor to cause the system to:
        receive a first request for first data to be sent to a first device, the first data having been stored in a storage medium prior to receipt of the first request;
        determine that the first data is to be encoded according to a first encoding scheme prior to being sent to the first device;
        generate second data representing at least a first attribute of the first request;
        receive the first data from the storage medium;
        after receiving the first data, generate first encoded data using the first encoding scheme, the second data, and the first data, the first encoded data representing at least the second data and at least a portion of the first data; and
        cause the first encoded data to be sent to the first device.

19. The system of claim 18, wherein the at least one memory further comprises instructions that, when executed by the at least one processor, further cause the system to:
    receive, from a second device, a second request for the first data;
    determine that the second device is authorized to access the first data;
    generate third data representing at least a second attribute of the second request;
    receive the first encoded data; and
    after receiving the first encoded data, generate second encoded data using the first encoding scheme, the third data, and the first encoded data, the second encoded data representing at least the third data and at least a portion of the first encoded data, wherein the second encoded data is generated at least in part by overwriting the second data represented in the first encoded data with the third data.

20. The system of claim 18, wherein the at least one memory further comprises instructions that, when executed by the at least one processor, further cause the system to:
    receive, from a second device, a second request for the first data;
    determine that the second device is authorized to access the first data;
    generate third data representing at least a second attribute of the second request;
    receive the first encoded data; and
    after receiving the first encoded data, generate second encoded data using the first encoding scheme, the third data, and the first encoded data, the second encoded data representing at least the third data, the second data, and a portion of the first data.

21. The system of claim 18, wherein the at least one memory further comprises instructions that, when executed by the at least one processor, further cause the system to:
    store third data indicating that the first encoded data corresponds to the first data and the first device.

22. The system of claim 18, wherein the second data is positioned in the first encoded data based at least in part on the first encoding scheme, the first encoding scheme indicating a first bit position to be overwritten.

* * * * *